(12) United States Patent
Teshler et al.

(10) Patent No.: US 9,866,563 B2
(45) Date of Patent: Jan. 9, 2018

(54) SPECIALLY PROGRAMMED COMPUTING SYSTEMS WITH ASSOCIATED DEVICES CONFIGURED TO IMPLEMENT SECURE COMMUNICATION LOCKDOWNS AND METHODS OF USE THEREOF

(71) Applicant: Guardknox Cyber Technologies Ltd., Rosh Haain (IL)

(72) Inventors: Dionis Teshler, Tel Aviv (IL); Moshe Shlisel, Rosh Ha Ain (IL); Idan Nadav, Holon (IL)

(73) Assignee: Gaurdknox Cyber Technologies Ltd., Rosh Haain (IL)

( * ) Notice: Subject to any disclaimer, the term of this patent is extended or adjusted under 35 U.S.C. 154(b) by 0 days.

(21) Appl. No.: 15/486,055

(22) Filed: Apr. 12, 2017

(65) Prior Publication Data

US 2017/0295182 A1  Oct. 12, 2017

Related U.S. Application Data

(60) Provisional application No. 62/321,372, filed on Apr. 12, 2016.

(51) Int. Cl.
 *H04L 29/06* (2006.01)
 *H04L 12/58* (2006.01)

(52) U.S. Cl.
 CPC .............. *H04L 63/10* (2013.01); *H04L 51/12* (2013.01); *H04L 63/1433* (2013.01)

(58) Field of Classification Search
 CPC ...... H04L 63/10; H04L 63/1433; H04L 51/12
 See application file for complete search history.

(56) References Cited

U.S. PATENT DOCUMENTS 6,092,194 A    7/2000 Touboul
6,098,054 A *  8/2000 McCollom ............ G06F 21/121
                                                        705/51

(Continued)

FOREIGN PATENT DOCUMENTS

WO      2015/088506 A1    6/2015
WO   WO 2017/042012 A1 *  3/2017 ............. H04L 29/06

OTHER PUBLICATIONS

Vasudevan et al., "Lockdown: A Safe and Practical Environment for Security Applications"; CyLab, Carnegie Mellon University, Jul. 14, 2009.

(Continued)

Primary Examiner — Darren B Schwartz
(74) Attorney, Agent, or Firm — Greenberg Traurig, LLP

(57) ABSTRACT

In some embodiments, the present invention provides for an exemplary inventive device which includes at least the following components: a secure lockdown component that is operationally associated with at least one electronic control unit (ECU) of at least one network; where the secure lockdown component is configured such that the device physically separates at least one of: i) the at least one network from any other network, ii) the at least one network from external inputs directed to the at least one network, iii) the at least one ECU from at least one other ECU, iv) the at least one ECU from external inputs directed to the at least one ECU, v) at least one memory component within the at least one ECU from at least one processing unit within the at least one ECU, and vi) any combination thereof.

30 Claims, 28 Drawing Sheets

(56) References Cited

U.S. PATENT DOCUMENTS

| | | | |
|---|---|---|---|
| 6,324,569 B1* | 11/2001 | Ogilvie | G06Q 10/107 709/206 |
| 6,496,935 B1 | 12/2002 | Fink et al. | |
| 6,571,136 B1 | 5/2003 | Staiger | |
| 7,797,737 B2 | 9/2010 | Eibach et al. | |
| 7,865,947 B2 | 1/2011 | Fanton et al. | |
| 8,299,894 B1* | 10/2012 | Semeniuk | 307/10.2 |
| 9,413,722 B1* | 8/2016 | Ahn | H04L 63/0263 |
| 2001/0012296 A1* | 8/2001 | Burgess | H04L 63/0236 370/392 |
| 2002/0156564 A1* | 10/2002 | Preston | G05B 15/02 701/70 |
| 2002/0166063 A1* | 11/2002 | Lachman, III | H04L 63/0263 726/23 |
| 2003/0051155 A1* | 3/2003 | Martin | H04L 63/029 726/11 |
| 2003/0115344 A1* | 6/2003 | Tang | H04L 63/0272 709/229 |
| 2003/0131116 A1* | 7/2003 | Jain | H04L 12/5602 709/230 |
| 2003/0154399 A1* | 8/2003 | Zuk | H04L 63/0254 726/11 |
| 2004/0215976 A1* | 10/2004 | Jain | H04L 63/1458 726/23 |
| 2004/0263323 A1* | 12/2004 | Seike | B60R 25/1004 340/426.1 |
| 2005/0179546 A1* | 8/2005 | Lanigan | G07C 9/00166 340/545.6 |
| 2005/0221800 A1 | 10/2005 | Jackson et al. | |
| 2005/0222933 A1 | 10/2005 | Wesby | |
| 2005/0238022 A1* | 10/2005 | Panigrahy | H04L 63/0254 370/392 |
| 2006/0048106 A1* | 3/2006 | Citron | G06F 9/44557 717/136 |
| 2006/0059265 A1* | 3/2006 | Keronen | H04L 29/06 709/228 |
| 2006/0080497 A1* | 4/2006 | Boning | G11C 16/22 711/103 |
| 2006/0146816 A1* | 7/2006 | Jain | H04L 63/1408 370/389 |
| 2006/0184670 A1* | 8/2006 | Beeson | H04L 43/026 709/224 |
| 2006/0248172 A1* | 11/2006 | Zurawka | G06F 8/665 709/220 |
| 2007/0089163 A1* | 4/2007 | Denton | H04L 63/0428 726/2 |
| 2007/0127460 A1 | 6/2007 | Wilber et al. | |
| 2007/0143846 A1* | 6/2007 | Lu | G06F 21/554 726/23 |
| 2007/0247288 A1* | 10/2007 | Alrabady | H04W 48/02 340/425.5 |
| 2008/0005786 A1* | 1/2008 | Dreymann | G06Q 10/107 726/4 |
| 2008/0040005 A1* | 2/2008 | Breed | B60J 10/00 701/48 |
| 2008/0052644 A1* | 2/2008 | Ashar | G06F 17/30985 716/133 |
| 2008/0076547 A1* | 3/2008 | Bigelow | G07F 17/3241 463/29 |
| 2008/0104187 A1* | 5/2008 | Wilson | H04L 51/12 709/206 |
| 2008/0120604 A1* | 5/2008 | Morris | G06F 11/3644 717/128 |
| 2008/0147949 A1* | 6/2008 | Miyake | G06F 11/0736 710/267 |
| 2008/0280602 A1* | 11/2008 | Ban | G06F 21/572 455/420 |
| 2009/0047929 A1* | 2/2009 | Chesnutt | H04L 51/38 455/411 |
| 2009/0125985 A1* | 5/2009 | Traenkenschuh | G06F 21/51 726/4 |
| 2009/0167524 A1* | 7/2009 | Chesnutt | G08C 17/02 340/539.19 |
| 2009/0177750 A1* | 7/2009 | Lee | G06Q 10/107 709/206 |
| 2009/0204560 A1* | 8/2009 | Kim | G06F 11/0709 706/47 |
| 2009/0228557 A1* | 9/2009 | Ganz | G06F 17/2765 709/206 |
| 2010/0017104 A1* | 1/2010 | Kwong | G08G 1/0104 701/117 |
| 2010/0017543 A1* | 1/2010 | Preston | B60R 25/00 710/16 |
| 2010/0017555 A1* | 1/2010 | Chang | G06F 12/0246 711/103 |
| 2010/0037069 A1* | 2/2010 | Deierling | G06F 12/1433 713/193 |
| 2010/0142382 A1* | 6/2010 | Jungck | H04L 63/0245 370/242 |
| 2010/0318794 A1 | 12/2010 | Dierickx | |
| 2011/0103390 A1* | 5/2011 | Hall | H04L 12/40163 370/400 |
| 2011/0167260 A1 | 7/2011 | Fanton et al. | |
| 2012/0309417 A1* | 12/2012 | Blom | H04L 51/20 455/456.1 |
| 2012/0317194 A1* | 12/2012 | Tian | H04W 8/005 709/204 |
| 2013/0104231 A1* | 4/2013 | Niner | H04L 63/1416 726/23 |
| 2013/0227650 A1* | 8/2013 | Miyake | H04L 63/08 726/3 |
| 2013/0247226 A1 | 9/2013 | Sebes et al. | |
| 2013/0305357 A1 | 11/2013 | Ayyagari et al. | |
| 2014/0036693 A1* | 2/2014 | Mabuchi | H04L 43/10 370/243 |
| 2014/0121891 A1* | 5/2014 | Barrett | H04L 69/08 701/33.2 |
| 2014/0143839 A1* | 5/2014 | Ricci | H04W 12/06 726/4 |
| 2014/0328352 A1* | 11/2014 | Mabuchi | H04L 12/4035 370/451 |
| 2014/0334300 A1* | 11/2014 | Horihata | H04L 12/40039 370/230 |
| 2014/0337976 A1* | 11/2014 | Moeller | H04L 63/1425 726/23 |
| 2015/0020152 A1* | 1/2015 | Litichever | H04L 63/14 726/1 |
| 2015/0066361 A1* | 3/2015 | Stenneth | G06Q 10/047 701/465 |
| 2015/0089236 A1 | 3/2015 | Han et al. | |
| 2015/0113638 A1* | 4/2015 | Valasek | H04L 63/1441 726/22 |
| 2015/0135271 A1* | 5/2015 | Forest | H04L 9/3226 726/4 |
| 2015/0191135 A1 | 7/2015 | Ben Noon et al. | |
| 2015/0191136 A1 | 7/2015 | Ben Noon et al. | |
| 2015/0195182 A1* | 7/2015 | Mathur | H04L 43/50 714/27 |
| 2015/0237055 A1* | 8/2015 | Canoy | H04L 63/101 726/1 |
| 2015/0358351 A1* | 12/2015 | Otsuka | H04L 12/4625 726/23 |
| 2016/0021127 A1* | 1/2016 | Yan | G06F 21/554 726/23 |
| 2016/0161946 A1* | 6/2016 | Wuth Sepulveda | G05D 1/0022 701/2 |
| 2016/0189444 A1 | 6/2016 | Madhok et al. | |
| 2016/0197944 A1* | 7/2016 | Allouche | H04L 63/1416 726/23 |
| 2016/0219028 A1* | 7/2016 | Baltes | H04L 63/08 |
| 2016/0224806 A1* | 8/2016 | Takada | G06F 21/64 |

(56) References Cited

U.S. PATENT DOCUMENTS

2017/0013006 A1\* 1/2017 Ujiie .................. H04L 12/6418
2017/0078884 A1\* 3/2017 Tanabe ................. B60R 16/023
2017/0093866 A1\* 3/2017 Ben-Noon ............ H04L 9/3234

OTHER PUBLICATIONS

Koscher, et al., "Experimental Security Analysis of a Modern Automobile", In: Security and Privacy (SP), 2010 IEEE Symposium on. May 19, 2010, retrieved from http://feihu.eng.ua.edu/NSF_CPS/year1/w9_1.pdf, entire document.
International Search Report and Written Opinion for PCT Application No. PCT/IB2017/0000509, dated Aug. 7, 2017.

\* cited by examiner

|  8 bit    |  8 bit          |  8 bit     |  8 bit  |
|-----------|-----------------|------------|---------|
| 0       8 | Destination ECU 16 | Message ID 24 | Value 31 |
| Source ECU |                 |            |         |

|  8 bit        |  8 bit              |  8 bit  |  8 bit      |
|---------------|---------------------|---------|-------------|
| 0           8 | 2                16 | 1    24 | 65       31 |
| Engine ECU    | Instrument Cluster ECU | Speed Update Message | Speed Value |

*Figure 15*

| | | | |
|---|---|---|---|
| 1 | 2 | 1 | 0-250 |
| 1 | 4 | 1 | 0-250 |
| 2 | 4 | 2 | [0,1] |
| 3 | 1 | 3 | 0-1 |
| 4 | 1 | 4 | [0,1] |
| 4 | 2 | 5 | [0,1] |

SPECIALLY PROGRAMMED COMPUTING SYSTEMS WITH ASSOCIATED DEVICES CONFIGURED TO IMPLEMENT SECURE COMMUNICATION LOCKDOWNS AND METHODS OF USE THEREOF

RELATED APPLICATIONS

This application claims the priority of U.S. Provisional Appln. No. 62/321,372, filed Apr. 12, 2016, entitled "SPECIALLY PROGRAMMED COMPUTING SYSTEMS WITH ASSOCIATED DEVICES CONFIGURED TO IMPLEMENT SECURITY COMMUNICATION, CONFIGURATION, AND PHYSICAL SEPARATION LOCKDOWNS AND METHODS OF USE THEREOF," which is incorporated herein by reference in its entirety for all purposes.

FIELD OF THE INVENTION

In some embodiments, the present invention generally relates to specially programmed computing systems with associated devices configured to implement security communication and configuration lockdowns and methods of use thereof.

BACKGROUND OF THE INVENTION

For example, a vehicle may include a multitude of computers, Electronic Control Units (ECUs). Typically, ECUs may be interconnected through various networks which may include external communication capabilities, such as Bluetooth™, 3G, Wi-Fi, and others. In some cases, such exemplary external communication capabilities may be utilized to track, control and/or update the vehicle's ECUs and/or operational capabilities.

SUMMARY OF THE INVENTION

In some embodiments, the present invention provides for an exemplary inventive device which includes at least the following components: at least one secure lockdown component that is operationally associated with at least one electronic control unit (ECU) of at least one network; where the at least one secure lockdown component is configured such that the device physically separates at least one of: i) the at least one network from any other network, ii) the at least one network from external inputs directed to the at least one network, iii) the at least one ECU from at least one other ECU, iv) the at least one ECU from external inputs directed to the at least one ECU, v) at least one memory component within the at least one ECU from at least one processing unit within the at least one ECU, and vi) any combination thereof; where the at least one secure lockdown component includes at least one processor programmed to execute at least one secure lockdown procedure and at least one non-volatile memory component, storing at least one: i) at least one approved message dictionary database, including entries for all valid electronic messages, ii) at least one approved communication schema database, including at least one entry for at least one approved communication schema, iii) at least one pre-defined state machine, iv) approved content of at least one memory component within the at least one ECU, and vii) approved configuration of at least one hardware unit within the at least one ECU; where the at least one processor of the at least one secure lockdown component is configured, at runtime, to execute the at least one secure lockdown procedure that is configured to: analyze each electronic message that is at least one of: i) directed to the at least one network, ii) transmitted within the at least one network, iii) to be externally transmitted from the at least one network to at least one external computing device, iv) directed to the at least ECU, or v) to be transmitted from the at least one ECU; vi) to be transmitted to the at least one memory component within the at least one ECU; vii) to be transmitted to configure at least one hardware component within the at least one ECU; where the at least one secure lockdown component is configured to analyze each electronic message based on at least one of: i) the at least one approved message dictionary database, including entries for all valid electronic messages, ii) the at least one approved communication schema database, including at least one entry for at least one approved communication schema, and iii) the at least one pre-defined state machine; identify, based on the analysis of each electronic message, at least one unauthorized electronic message that would cause at least one unapproved change to or violate at least one of: i) at least one operational configuration of the at least one ECU of the at least one network, ii) at least one communication schema that is utilized by the at least one ECU to communicate with at least one of: 1) the at one other ECU and 2) at least one external electronic computing device located outside of the at least one network, iii) the at least one approved message dictionary database, iv) the at least one approved communication schema database, v) the at least one pre-defined state machine, vi) the approved content of the at least one memory component within the at least one ECU; vii) the approved configuration of the at least one hardware unit within the at least one ECU; and block the at least one unauthorized electronic message from passing through the at least one secure lockdown component.

In some embodiments, the at least one secure lockdown procedure is at least one communication secure lockdown procedure.

In some embodiments, the at least one secure lockdown procedure is at least one configuration secure lockdown procedure.

In some embodiments, the present invention provides for a method that at least includes incorporating an exemplary inventive device into a vehicle, where the exemplary inventive device includes at least the following components: at least one secure lockdown component that is operationally associated with at least one electronic control unit (ECU) of at least one network; where the at least one ECU resides within the vehicle; where the at least one secure lockdown component is configured such that the device physically separates at least one of: i) the at least one network from any other network, ii) the at least one network from external inputs directed to the at least one network, iii) the at least one ECU from at least one other ECU, iv) the at least one ECU from external inputs directed to the at least one ECU, v) at least one memory component within the at least one ECU from at least one processing unit within the at least one ECU, and vi) any combination thereof; where the at least one secure lockdown component includes at least one processor programmed to execute at least one secure lockdown procedure and at least one non-volatile memory component, storing at least one: i) at least one approved message dictionary database, including entries for all valid electronic messages, ii) at least one approved communication schema database, including at least one entry for at least one approved communication schema, iii) at least one pre-defined state machine, iv) approved content of at least one memory component within the at least one ECU, and vii)

approved configuration of at least one hardware unit within the at least one ECU; where the at least one processor of the at least one secure lockdown component is configured, at runtime, to execute the at least one secure lockdown procedure that is configured to: analyze each electronic message that is at least one of: i) directed to the at least one network, ii) transmitted within the at least one network, iii) to be externally transmitted from the at least one network to at least one external computing device, iv) directed to the at least ECU, or v) to be transmitted from the at least one ECU; vi) to be transmitted to the at least one memory component within the at least one ECU; vii) to be transmitted to configure at least one hardware component within the at least one ECU; where the at least one secure lockdown component is configured to analyze each electronic message based on at least one of: i) the at least one approved message dictionary database, including entries for all valid electronic messages, ii) the at least one approved communication schema database, including at least one entry for at least one approved communication schema, and iii) the at least one pre-defined state machine; identify, based on the analysis of each electronic message, at least one unauthorized electronic message that would cause at least one unapproved change to or violate at least one of: i) at least one operational configuration of the at least one ECU of the at least one network, ii) at least one communication schema that is utilized by the at least one ECU to communicate with at least one of: 1) the at one other ECU and 2) at least one external electronic computing device located outside of the at least one network, iii) the at least one approved message dictionary database, iv) the at least one approved communication schema database, v) the at least one pre-defined state machine, vi) the approved content of the at least one memory component within the at least one ECU; vii) the approved configuration of the at least one hardware unit within the at least one ECU; and block the at least one unauthorized electronic message from passing through the at least one secure lockdown component.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

FIGS. 1-29 show some exemplary aspects of the present invention depicted in accordance with at least some principles of at least some embodiments of the present invention.

DETAILED DESCRIPTION OF THE INVENTION

Figure 1:
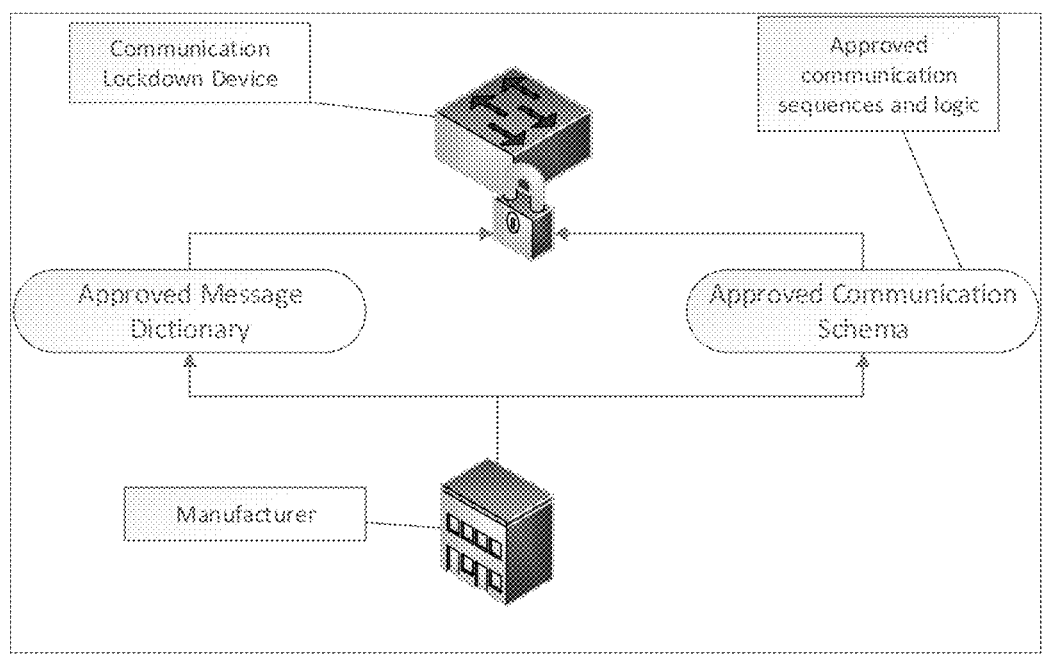

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

For example, while illustrative examples of various embodiments detailed herein are described to be implemented in the automotive industry, such as in various types of moving vehicles (e.g., cars, tracks, buses, etc.); many other implementations may become apparent to those of ordinary skill in the art; and the principles, methods, systems, and devices of the present invention can be similarly implemented in various other environments which utilize computing devices. For instance, the principles, methods, systems, and devices of the present invention can be implemented, with or without any modification(s) that may become apparent to those of ordinary skill in the art, in numerous industries, environments, and computing devices such as, but not limited to, aviation, industrial control, computers, medical devices, financial terminals, utilities management, home security, critical infrastructure computing systems (e.g., traffic lights, power grids, etc.), and other similarly suitable applications.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds (e.g., 5-10 seconds).

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the terms "communication" and "message" can be used interchangeably and it shall be assumed that the communication can corresponds to a single message or to a plurality of messages.

As used herein, the term "runtime" corresponds to any behavior that is dynamically determined during an execution of a software application or at least a portion of software application.

In some embodiments, the inventive specially programmed computing systems with associated devices configured to implement the security communication lockdown are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). In some embodiments, the inventive specially programmed computing systems with associated devices configured to implement cyber security lockdown are configured to process/track/manage interactions associated with at least 10 other electronic/computing devices (e.g., but not limited to, 10-99), at least 100 other electronic/computing devices (e.g., but not limited to, 100-999), at least 1,000 (e.g., but not limited to, 1,000-9,999), at least 10,000 other electronic/computing devices (e.g., but not limited to, 10,000-99,999), at least 100,000 other electronic/computing devices (e.g., but not limited to, 100,000-999,999), at least 1,000,000 other electronic/computing devices (e.g., but not limited to, 1,000,000-9,999,999), at least 10,000,000 other electronic/computing devices (e.g., but not limited to, 10,000,000-99,999,999), at least 100,000,000 other electronic/computing devices (e.g., but not limited to, 100,000,000-999,999,999), at least 1,000,000,000 other electronic/computing devices (e.g., but not limited to, 1,000,000,000-10,000,000,000).

As used herein, the terms "cyber security lockdown," "security communication lockdown," "cyber security communication lockdown," "configuration lockdown," and similar identify at least one inventive methodology of some embodiments of the present invention which is based on the exemplary principle of locking down an trustful/approved configuration, communication schema, or both; and securing them against any attempt of cause a change and/or modification. The inventive lockdowns of the present invention are agnostic to cyber-attacks, focusing only on securing at least one approved configuration for all communications taking place within a specific set of interconnected networks (e.g., all networks in the vehicle, all networks in a power plant, etc.).

In some embodiments, an exemplary inventive lockdown of a particular communication can be implemented on a bit level (e.g., every bit is accounted for in a message and/or a set of messages) with contextual communication awareness (e.g., only specific sequences (e.g., a transmission and/or generation order) and/or rates of communication messages are allowed, etc.). In some embodiments, the principles of the inventive lockdowns include maintaining a completely static state of a configuration and/or a runtime environment of particular computing device(s) so that nothing in the particular computing device(s) would change during the runtime.

Illustrative Non-Limiting Examples of Some Embodiments the Present Invention Operating in the Automotive Industry In some embodiments, the inventive specially programmed computing systems with associated devices configured to implement the security communication lockdown are configured to reside within a vehicle which typically includes a multitude (e.g., 10, 20, 30, 40, 50, 60, etc.) of computing devices, termed Electronic Control Units (ECUs). An exemplary ECU of an exemplary control system of the vehicle receives the user generated signals and/or the signals generated by the sensors and/or actuators, and, responsive to the signals, operates to control a vehicle component involved in performing of a certain function. The exemplary ECU of the exemplary control system may also receive and/or process signals relevant to performance of the function generated by, and/or by components in, other vehicle control systems. For example, a vehicle throttle by wire control system that replaces a conventional cable between an accelerator pedal and an engine throttle may comprise an electronic accelerator pedal, an ECU also referred to as an engine control module (ECM), and an electronic throttle valve that controls airflow into the engine and thereby power that the engine produces. The electronic accelerator pedal may generate electronic signals responsive to positions to which a driver depresses the pedal. The exemplary ECM may receive the accelerator pedal signals, and in addition electronic signals that may be generated by other sensors, actuators, and electronic control systems in the vehicle that provide information relevant to the safe and efficient control of the engine via an in-vehicle communication network. The exemplary ECM may then process the driver input signals and the other relevant signals to generate electronic control signals that control the throttle. Among the other sensors actuators, and electronic control systems that may provide relevant signals to the ECM over the in-vehicle network are, air-flow sensors, throttle position sensors, fuel injection sensors, engine speed sensors, vehicle speed sensors, brake force and other traction control sensors comprised in a brake by wire system, and cruise control sensors.

In some embodiments, the inventive specially programmed computing systems with associated devices configured to implement the security communication lockdown are configured to interact with the exemplary ECUs which can be interconnected through various computing networks (e.g., buses) which can involve external communications (e.g., Bluetooth™, 3G, Wi-Fi, and others) that may be used by the manufacturer, passengers, insurance agencies, and various other $3^{rd}$ party entities for various purposes such as, but not limited to, track, control, and/or update the vehicle remotely. For example, in-vehicle communication networks of modern vehicles are typically required to support communications for a relatively large and increasing number of electronic control systems of varying degrees of criticality to the safe and efficient operation of the vehicles. For example, a vehicle may include as many as, but not limited to, seventy or more control system ECUs that communicate with each other and sensors and actuators that monitor and control vehicle functions via the in-vehicle network. The ECU's may, by way of example, be used to control in addition to engine throttle described above, power steering, transmission, antilock braking (ABS), airbag deployment, cruise control, power windows, doors, and mirror adjustment. In addition, an in-vehicle network typically supports on board diagnostic (OBD) systems and communication ports, various vehicle status warning systems, collision avoidance systems, audio and visual information and entertainment (infotainment) systems and processing of images acquired by on-board camera systems. The in-vehicle network in general also provides access to mobile communication networks, Wi-Fi and Bluetooth communications, radio, TPMS (tire pressure monitor system) V2X (vehicle to vehicle and vehicle to infrastructure communication), keyless entry system, the Internet, and GPS (global positioning system).

In some embodiments, the inventive specially programmed computing systems with associated devices configured to implement the security communication lockdown are configured to prevent cyber threats (e.g., unauthorized access by a 3$^{rd}$ party, injection of a computer virus, etc.). In some embodiments, the inventive specially programmed computing systems with associated devices configured to implement the security configuration lockdown are configured to maintain the configuration and runtime environment of the various ECUs in the vehicle in the completely static state, which is enforced so nothing in them would change during runtime.

In some embodiments, the inventive specially programmed computing systems with associated devices configured to implement security communication lockdown are configured to rely on at least one "approved message dictionary" database and at least one "approved communication schema" database to execute the security communication lockdown.

In some embodiments, the approved message dictionary database stores definitions for all valid messages as predefined based on manufacturer's specification and/or input from another designated authority. For example, the approved message dictionary database can store the "approved" definitions of each message structure and approved value(s) associated with each parameter of each respective message.

In some embodiments, the approved communication schema database stores definitions for all communication schemas as defined based on manufacturer's specification and/or input from another designated authority. For example, the approved communication schema database can store the "approved" definitions of at least one of the following:

all approved sequences of messages,
approved source-destination pairs for specific messages,
communication rates (e.g., a periodicity of transmission of each specific message),
messaging logic (protocol) according to the vehicle's internal state (e.g., engine status, particular speed, lights on, ext.) and/or external inputs (e.g., rain, slippery road, status of at least one external system that is connected or seeks to connect to the vehicle, etc.), and
any combinations thereof.

In some embodiments, which utilize inventive state machine(s), the exemplary inventive state machine can be defined to govern which message(s) is/are allowed in a particular state (e.g., the particular current state). For example, the exemplary inventive state machine can be defined to govern at least one for each particular state:

all approved sequences of messages,
approved source-destination pairs for specific messages,
communication rates (e.g., a periodicity of transmission of each specific message),
messaging logic according to the vehicle's internal state (e.g., engine status, particular speed, lights on, ext.) and/or external inputs (e.g., rain, slippery road, status of at least one external system that is connected or seeks to connect to the vehicle, etc.), and
any combinations thereof.

In some embodiments, the approved message dictionary and approved communication schema, can be represented using a three (3) logical layer model which may include, but not limited to, for example the following logical layers:

1. Content (data) layer—which represents all approved/ valid (pre-defined) messages contained in the approved message dictionary;

2. Routing layer—which represents all approved source-destination pairs for specific messages; and
3. Context (state) layer—which represents at least one of:
all approved sequences of messages,
communication rates (e.g., a periodicity of transmission of each specific message),
messaging logic according to the vehicle's internal state (e.g., engine status, particular speed, lights on, ext.) and/or external inputs (e.g., rain, slippery road, status of at least one external system that is connected or seeks to connect to the vehicle, etc.), and
any combinations thereof.

In some embodiment, all three layers together can be implemented using the exemplary inventive state machine as detailed herein.

In some embodiments, the inventive specially programmed computing systems with associated devices configured to implement the security communication lockdown are configured to electronically obtain the manufacture specification and automatically generate the at least one approved message dictionary database and/or the at least one approved communication schema database. In some embodiments, the definitions associated with the approved message dictionary and the definitions associated with the approved communication schemas can reside within the same database(s).

In some embodiments, the inventive specially programmed computing systems with associated devices configured to implement the security communication lockdown are configured to include exemplary components identified in FIG. 1. For example, in some embodiments, to enforce the security communication lockdown, the exemplary inventive device(s) configured to implement the security communication lockdown can include one or several ECUs installed inside the vehicle networks so that a predetermined portion of or all communications between various vehicle networks flow through the inventive device(s) configured to implement the security communication lockdown and cannot bypass them. In some embodiments, the exemplary inventive device(s) configured to implement the security communication lockdown can be configured to control only a part of the vehicle networks which require the security communication lockdown. In some embodiments, the exemplary inventive device(s) configured to implement the security communication lockdown can be configured to control only a single ECU communication to a particular network. In some embodiments, to enforce the security communication lockdown, the exemplary inventive device(s) is/are configured to be transparent to all other ECUs whose communications can pass through without them requiring any awareness of the inventive device(s)' capabilities and/or functions. For example, other ECUs can continue communicating as if it wasn't there.

Figure 2:
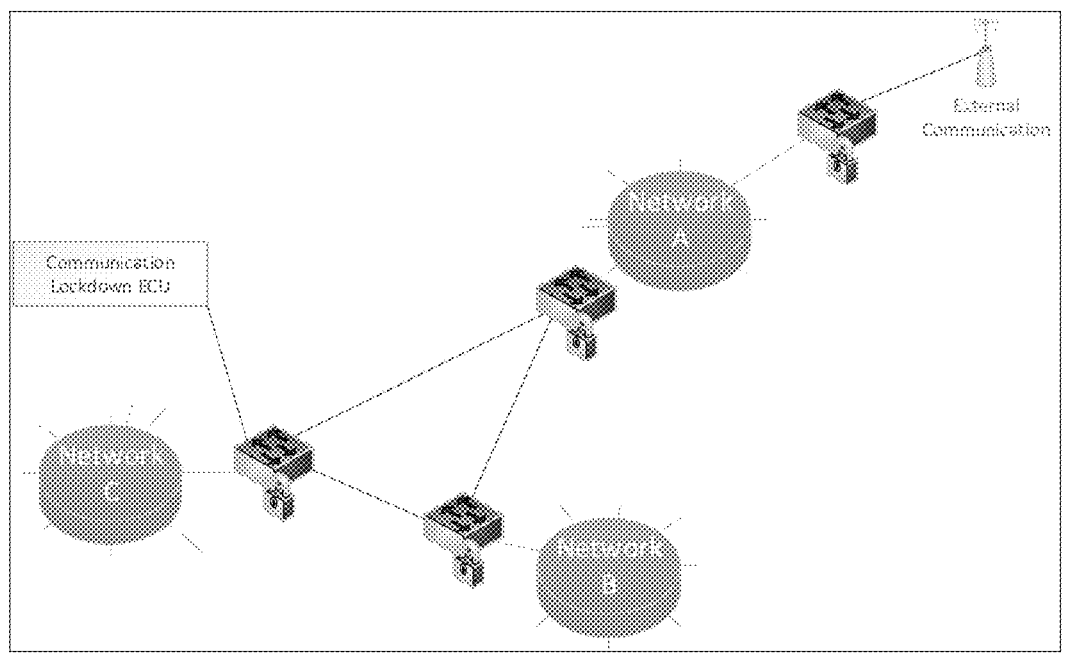

In some embodiments, to enforce the security communication lockdown in a distributed architecture, as illustrated in FIG. 2, the exemplary inventive specially programmed computing systems can include numerous inventive devices configured to implement the security communication lockdown which are positioned such as, but not limited to, that:

at least one inventive device configured to implement the security communication lockdown is dedicated to a particular communication network of the vehicle and acts as the entry/exit point,
at least one inventive device configured to implement the security communication lockdown is dedicate to each external communication point (e.g., before a 3G modem, Wi-Fi router, etc.) (FIG. 2), and/or at least one inventive device configured to implement the security communication lockdown is dedicated to specific ECUs within a network(s) (e.g., telematics ECU, infotainment ECU, engine management ECU).

Figure 3:
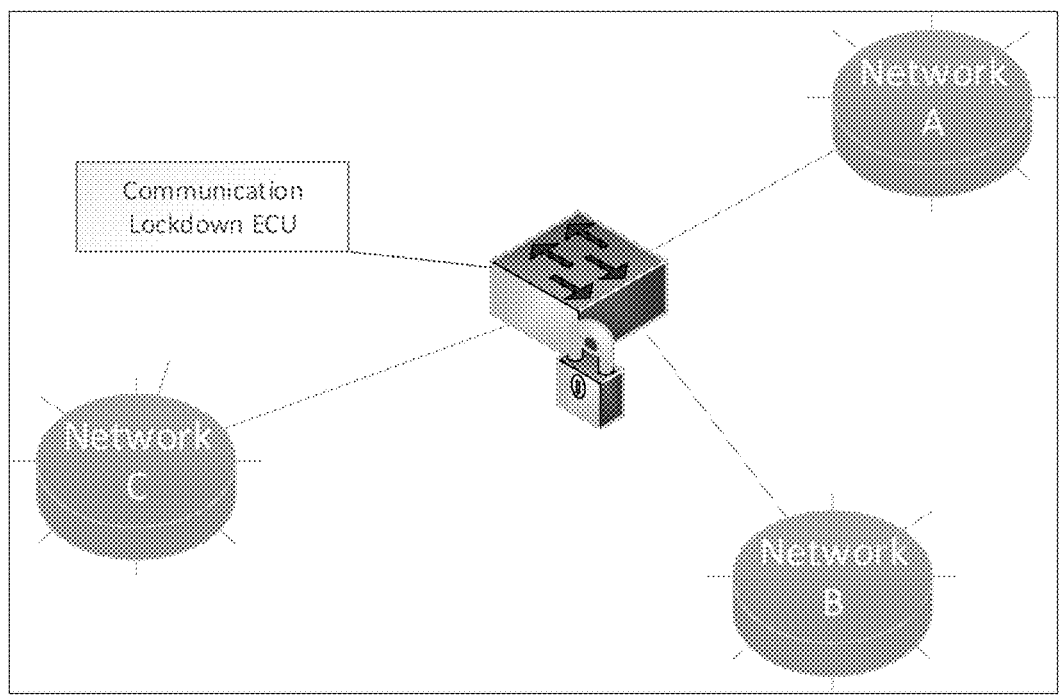

In some embodiments, to enforce the security communication lockdown in a centralized architecture, as illustrated in FIG. 3, the exemplary inventive specially programmed computing systems can include a central inventive device configured to implement the security communication lockdown which interconnects all of the networks of the vehicle. For example, as illustrated in FIG. 3, the exemplary central inventive device configured to implement the security communication lockdown networks is positioned such that it cannot be bypassed (all communication in/out of the network(s), in/out the external interface(s), and between the networks shall pass through the exemplary central inventive device).

Figure 4:
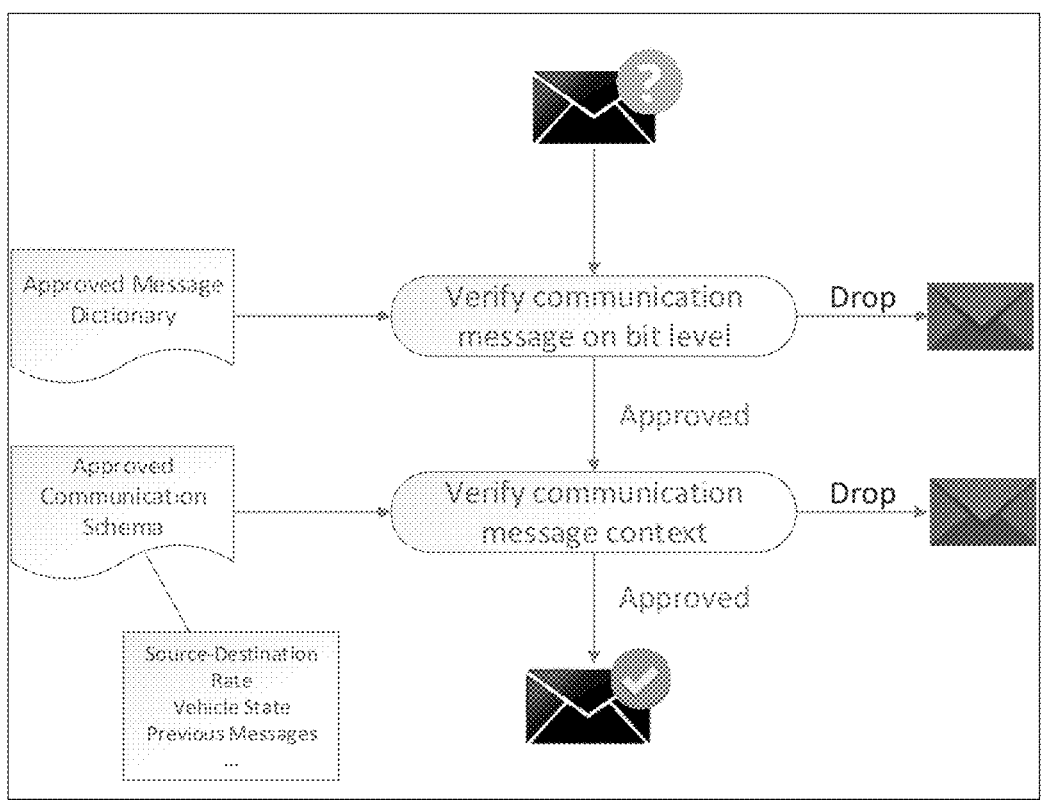

In some embodiments, to enforce the security communication lockdown, the exemplary inventive device(s) is/are configured to verify all communications against the approved message dictionary database and/or the approved communication schema database to ensure it is indeed valid. In some embodiments, as illustrated in FIG. 4, to enforce the security communication lockdown, the exemplary inventive device(s) is/are configured to drop (e.g., erase) any communication which has failed the validation against the approved message dictionary database and/or the approved communication schema database for any reason.

In some embodiments, to enforce the security communication lockdown, the exemplary inventive device(s) is/are configured to decide whether to allow a communication to be transferred to its intended destination(s) or to block it and by such prevent an attack.

In some embodiments, to enforce the security communication lockdown, the exemplary inventive device(s) is/are configured to log each communication which is blocked. In some embodiments, to enforce the security communication lockdown, the exemplary inventive device(s) is/are configured to generate an indication (e.g., an alert, a report) to report each failed communication each time or at a predetermined periodic basis in batches. In some embodiments, the indication may be in visual form, in audio form, or both.

In some embodiments, to enforce the security communication lockdown, the exemplary inventive device(s) is/are configured to be completely agnostic to a specific attack or attack strategy, by focusing on enforcing the lockdown on the approved communication(s) (i.e., only the predefined allowed communications are allow to pass). For example, the illustrative approved message dictionary database and/or the illustrative approved communication schema database are completely static and deterministic without any possible modification during runtime. In some embodiments, the inventive specially programmed computing systems with associated devices configured to implement the security communication lockdown are configured to require no updates (as long as the illustrative approved message dictionary database and/or each approved message communication schema within the illustrative approved communication schema database remain the same) and no connectivity to any external entity(ies). In some embodiments, the inventive specially programmed computing systems with associated devices configured to implement the security communication lockdown are configured to rely on a static decision mechanism according the illustrative approved message dictionary database and/or the illustrative approved message communication schema database.

In some embodiments, the inventive specially programmed computing systems with associated devices configured to implement the security communication lockdown are configured to provide physical separation between all networks that they inter-connect, and thus provide an additional layer of security against malicious or accidental unauthorized leak(s) between the networks.

In some embodiments, the inventive devices configured to implement the security communication lockdown are configured to be installed instead of Gateway ECU(s) which are typically present in the vehicles, and, thus, replace Gateway ECU(s) in form, fit and function, while providing the described inventive communication lockdown capability.

Figure 5:
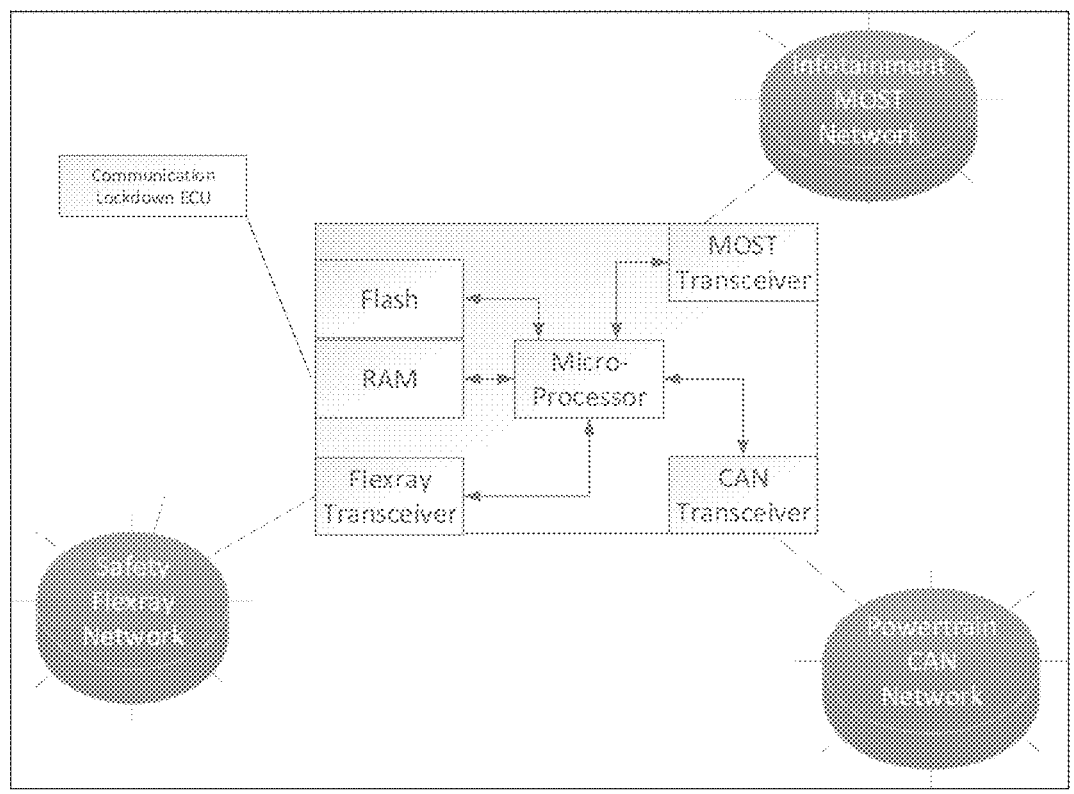

Illustrative Examples of the Central Inventive Device Configured to Implement the Security Communication Lockdown In one case, the exemplary central inventive device configured to implement the security communication lockdown (i.e., the inventive ECU) can interconnect three networks of the vehicle: the Infotainment network which is based on MOST (Media Oriented Systems Transport) protocol, the Powertrain network based on CAN (control area network) protocol and Safety network based on Ethernet and/or FlexRay (ISO 17458-1 to 17458-5) communication protocols. In some embodiments, as illustrated in FIG. 5, the exemplary central inventive device configured to implement the security communication lockdown can include at least the following components: at least one processor (e.g., micro-processor), a memory unit (e.g., flash storage memory, DDR RAM based runtime memory), at least one CAN transceiver, at least one MOST transceiver and at least one FlexRay transceiver.

In some embodiments, the exemplary micro-processor can have a software package based on Linux which includes all of the drivers in order to operate on the specific board (compatible with the processor and memory) and drivers for all three transceivers. For example, in the exemplary Linux implementation of the exemplary central inventive device configured to implement the security communication lockdown, there can be four (4) running processes in parallel: three processes which each handle a particular communication on the respective network and a fourth processor which runs the inventive security core which implements the security communication lockdown. The exemplary central inventive device configured to implement the security communication lockdown is configured to store the approved message dictionary database, which can contain the listing of all approved messages in, for example but not limited to, the XML format, and/or the approved communication schema database. For example, each approved message entry in the database can define, for example but not limited to, on the bit level (a bit level representation) all fields that the respective message can have.

In some embodiments, for example, each message can contain a unique message ID. In turn, the approved communication schema database can contain a definition for a respective communication schema, for example but not limited to, in the form of source ECU-target ECU pairs which are approved to communicate with each other. For example, for each pair, the approved communication schema database can contain a list of message IDs which correspond to the approved messages which can be passed between them each respective source ECU-target ECU pair. For example, for each pair, the approved communication schema database can also define the approved rate at which each of these messages can be sent (e.g., up to 2 times per second).

For example, for each pair, the approved communication schema database can also define the approved context or state(s) of the vehicle, communications, and/or network(s) in which each message can be sent (e.g., defining all combinations of messages which can precede the particular message before the particular message is authorized to be sent).

In some embodiments, as illustrated in FIG. 4, the exemplary central inventive device configured to implement the security communication lockdown is configured to handle each received communication, as follows, but not limited to. The exemplary central inventive device configured to implement the security communication lockdown is configured to receive the message and compare the message against the approved message dictionary database. If the exemplary central inventive device configured to implement the security communication lockdown does not match the message to an entry of the allowed messages in the approved message dictionary database, the exemplary central inventive device configured to implement the security communication lockdown is configured to block such message. If a match is found, in some embodiments, the exemplary central inventive device configured to implement the security communication lockdown is configured to log/store the message's message ID.

In some embodiments, the exemplary central inventive device configured to implement the security communication lockdown is configured to perform a next check to verify, based, at least in part, on the approved communication schema database, that the source and the destination ECUs and/or networks can communication with each other. If the message passes this check to for this source-destination pair and message ID, in some embodiments, the exemplary central inventive device configured to implement the security communication lockdown is configured to further perform a next check, by verifying the approved context.

In some embodiments, the exemplary central inventive device configured to implement the security communication lockdown is configured to contain in its memory the entire history of messages being passed since the exemplary central inventive device was turned on. In some embodiments, the exemplary central inventive device configured to implement the security communication lockdown is configured to further perform the next check, by checking against the history to determine whether, based on the approved communication schema database, the context of the message is approved (e.g., the pre-requisite messages which are required for this message to pass were recorded). If any of the detailed checks fails, the exemplary central inventive device configured to implement the security communication lockdown is configured to drop the message. If all the detailed checks clear, the exemplary central inventive device configured to implement the security communication lockdown is configured to send the message to its target network to which the destination ECU is connected.

For example, a tire pressure monitoring sensor (TPMS) which can be wirelessly connected to the Safety network sends a message containing the pressure of the right front tire to the infotainment computer. If the exemplary central inventive device configured to implement the security communication lockdown determines that this message is a valid message within the system when the match is found in the approved message dictionary database—i.e., there is an entry which defines that there could be a message from TPMS with the pressure of the right front tire. In addition, the approved communication schema database defines that the TPMS ECU can send messages to the Infotainment ECU up 1 time a second and with any context (without any prior history requirements), thus the exemplary central inventive device configured to implement the security communication lockdown verifies the message based on these determinations and passes the message to the infotainment ECU for display to the driver.

If the TPMS sensor is hacked and an attacker tries to send an engine stop message to the Engine ECU in the Powertrain network, the exemplary central inventive device configured to implement the security communication lockdown determines that, while the message itself is validated since it exists in the approved message dictionary database, the source-destination pair of TPMS ECU and engine ECU does not exist in the approved communication schema database. For example, the approved communication schema database may define that a particular context and a particular state of the vehicle do not allow the TPMS sensor to send a stop message to the engine. Consequently, the exemplary central inventive device configured to implement the security communication lockdown is configured to block (drop/erase) the message, preventing the attack.

In some embodiments, the exemplary central inventive device configured to implement the security communication lockdown is configured to add a piece of meta-data to the message which indicates that the message has been verified which is recognized by the destination ECU as to the validity of the message. In some embodiments, the exemplary central inventive device configured to implement the security communication lockdown is configured to alert the source ECU that the message has passed the verification.

Illustrative Examples of Configuration Lockdown of ECUs

In some embodiments, the inventive specially programmed computing systems are configured to implement the configuration lockdown procedures with respect to the inventive devices configured to implement the security communication lockdown but also implement the configuration lockdown procedures with respect each other ECU resided within the vehicle. For example, the security communication lockdown may be implemented inside a particular ECU (e.g., adding the inventive software/hardware component to the architecture of the ECU). In another example, the security communication lockdown may be implemented by attaching the inventive software/hardware component to the ECU which would implement the inventive communication lockdown between that such ECU and the network.

Figure 6:
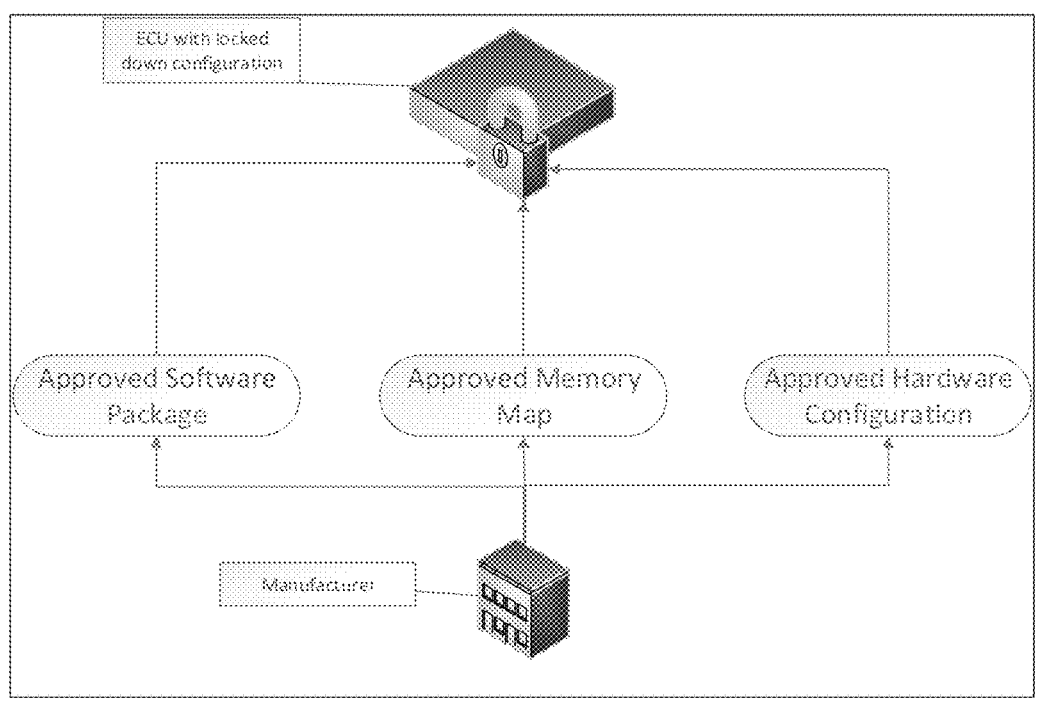

For example, as illustrated in FIG. 6, in general, the global state of an ECU at a particular time point/period is defined by the software its running, the state of its memory and/or its hardware components. For example, the exemplary inventive configuration lockdown procedure can rely on a definition of software and/or firmware packages (e.g., drivers) which is/are needed to operate a specific ECU,—i.e., "approved software package" definition —, which can be set by an authoritative entity (e.g., a manufacturer). For example, the exemplary inventive configuration lockdown procedure can further rely on an "approved memory map" definition which can define the contents of the memory which require the lockdown (e.g., the code of the software, configuration parameters, etc.), which at least a part of the memory is writable and/or readable. For example, the exemplary inventive configuration lockdown procedure can further rely on an "approved hardware configuration" definition which at least includes a mapping of all hardware in the specific ECU, including virtual hardware devices (e.g., hardware devices emulated in software). For example, the approved hardware configuration definition can include the hardware's configuration parameter(s) (e.g., address, clock, pin setting, operation modes, and any combination thereof).

In some embodiments, to enforce the configuration lockdown per ECU, an additional inventive software/firmware and/or hardware component(s) ("the configuration lockdown component(s)") is/are added to each ECU. In some embodiments, the type and operating condition(s) of the configuration lockdown component(s) may vary based on operational and/or environmental factor(s) related to each ECU. For example, in some embodiments, the configuration lockdown component(s) is/are configured to verify all memory access by each software and/or firmware running on the ECU and/or by other hardware components. For example, the configuration lockdown component(s) is/are configured to perform at least one of the following, but not limited to:

1) verify that the approved software package which is stored in the ECU memory and is loaded once it being executed has not been modified;
2) verify that the approved software package which is loaded into runtime memory (e.g., RAM) has not changed during the runtime;
3) verify that the approved memory map has not been invalidated based on the approved memory map definition—e.g., software and/or hardware entity(ies) is/are using only section(s) of memory which is/are approved for an operation it/they is/are trying to do (e.g., read-only section(s) of memory is/are not being written to, locked section(s) is/are not accessed, code and instruction memory is not used for data, etc.); and
4) verify that the memory which stores the hardware configuration has not been invalidated based on the approved hardware configuration definition (e.g., hardware address(es) is/are not changed, configuration parameter(s) is/are not changed beyond approved range(s), etc.).

For example, the hardware configuration is usually loaded during the initialization of the ECU, thus in a typical scenario the hardware configuration should not change at all during the runtime. In some embodiments, to enforce the configuration lockdown per ECU, the inventive configuration lockdown component(s) is/are configured to ensure that each hardware component receives only its specific configuration and nothing else.

Figure 7:
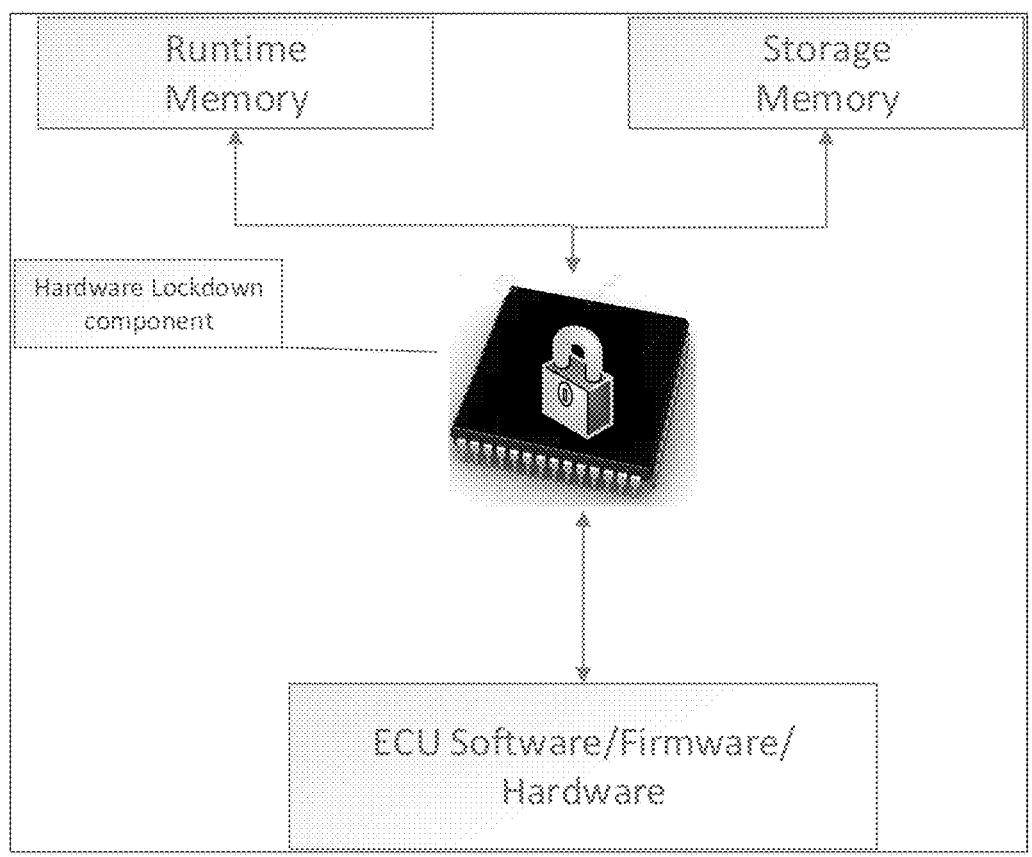

In some embodiments, as illustrated in FIG. 7, to enforce the configuration lockdown per ECU, the inventive configuration lockdown component(s) include at least one dedicated hardware component which physically separates the memory within the ECU (e.g., both storage and runtime memory) and enforces the approved configuration definition(s) (e.g., the approved software package definition, the approved memory map definition, the approved hardware configuration definition, and any combination thereof).

As reference herein, the term "storage memory" is directed to a non-volatile computer memory where code and/or data is/are stored at rest (e.g., Hard Drive, Flash memory, etc.).

As reference herein, the term "runtime memory" is directed to an operational memory used to store code and/or data which is/are used for execution of a currently running program (e.g., RAM).

Figure 8:
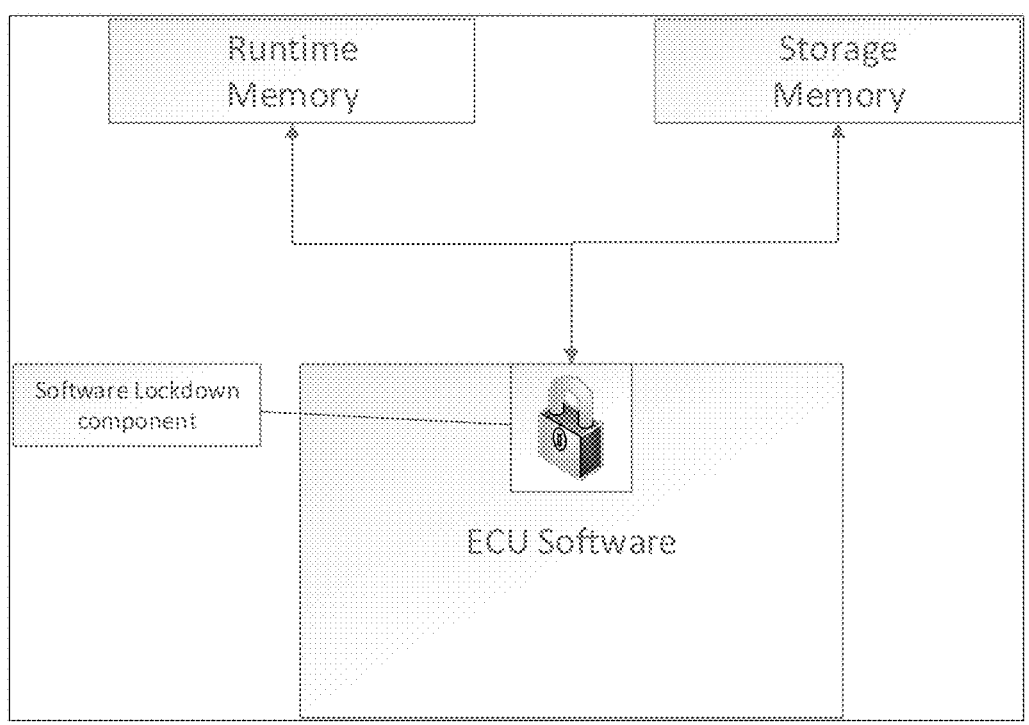

In some embodiments, as illustrated in FIG. 8, to enforce the configuration lockdown per ECU, the inventive configuration lockdown component(s) include a piece of software or firmware which may mediate all memory access on the ECU. For example, to enforce the configuration lockdown per ECU, the inventive configuration lockdown component(s) is/are configured to reside and/or operate in serial to the memory so the inventive configuration lockdown component(s) cannot be bypassed—i.e., all required memory accesses shall pass through the inventive configuration lockdown component(s).

In some embodiments, the inventive configuration lockdown component, such the one illustrated in FIG. 7, can include at least one processor (e.g., micro-processor) with built-in non-volatile memory (e.g., a System on Chip with the built-in Flash memory). In some embodiments, the inventive configuration lockdown component is connected directly to the storage memory and/or the runtime memory and all access is through the inventive configuration lockdown component. For example, the processor has a list in the memory of all memory section(s) which are readable and/or writable in the storage memory and/or the runtime memory. For example, the inventive configuration lockdown component is configured to check/verify each memory command coming from a main processor of the specific ECU and/or from another component of the specific ECU. For example, the inventive configuration lockdown component is configured to check at least one of the following, but not limited to:

Is the command for read or write?
which part of the memory is it trying to access?
what address within this memory is it trying to access?

For example, the inventive configuration lockdown component is configured to compare those parameters against the approved configuration definition(s) (e.g., the approved software package definition, the approved memory map definition, the approved hardware configuration definition, and any combination thereof) which is/are locally stored. For example, if the inventive configuration lockdown component determines that the required memory address is listed as accessible for the particular operation (e.g., read/write), the inventive configuration lockdown component is configured to allow the execution of such command. For example, if the inventive configuration lockdown component determines that the required memory address is listed as not being accessible for the particular operation, the inventive configuration lockdown component is configured to block the command. In some embodiments, the inventive configuration lockdown component can report back to an entity that sent the command that it had an access violation. In some embodiments, the inventive configuration lockdown component logs a record of the access violation.

In some embodiments, the present invention provides for an exemplary inventive device which includes at least the following components: at least one secure lockdown component that is operationally associated with at least one electronic control unit (ECU) of at least one network including; where the at least one secure lockdown component is configured such that the device physically separates at least one of: i) the at least one network from any other network, ii) the at least one network from external inputs directed to the at least one network, iii) the at least one ECU from at least one other ECU, iv) the at least one ECU from external inputs directed to the at least one ECU, v) at least one memory component within the at least one ECU from at least one processing unit within the at least one ECU, and vi) any combination thereof; where the at least one secure lockdown component includes at least one processor programmed to execute at least one secure lockdown procedure and at least one non-volatile memory component, storing at least one: i) at least one approved message dictionary database, including entries for all valid electronic messages, ii) at least one approved communication schema database, including at least one entry for at least one approved communication schema, iii) at least one pre-defined state machine, iv) approved content of at least one memory component within the at least one ECU, and vii) approved configuration of at least one hardware unit within the at least one ECU; where the at least one processor of the at least one secure lockdown component is configured, at runtime, to execute the at least one secure lockdown procedure that is configured to: analyze each electronic message that is at least one of: i) directed to the at least one network, ii) transmitted within the at least one network, iii) to be externally transmitted from the at least one network to at least one external computing device, iv) directed to the at least ECU, or v) to be transmitted from the at least one ECU; vi) to be transmitted to the at least one memory component within the at least one ECU; vii) to be transmitted to configure at least one hardware component within the at least one ECU; where the at least one secure lockdown component is configured to analyze each electronic message based on at least one of: i) the at least one approved message dictionary database, including entries for all valid electronic messages, ii) the at least one approved communication schema database, including at least one entry for at least one approved communication schema, and iii) the at least one pre-defined state machine; identify, based on the analysis of each electronic message, at least one unauthorized electronic message that would cause at least one unapproved change to or violate at least one of: i) at least one operational configuration of the at least one ECU of the at least one network, ii) at least one communication schema that is utilized by the at least one ECU to communicate with at least one of: 1) the at one other ECU and 2) at least one external electronic computing device located outside of the at least one network, iii) the at least one approved message dictionary database, iv) the at least one approved communication schema database, v) the at least one pre-defined state machine, vi) the approved content of the at least one memory component within the at least one ECU; vii) the approved configuration of the at least one hardware unit within the at least one ECU; and block the at least one unauthorized electronic message from passing through the at least one secure lockdown component.

In some embodiments, the at least one secure lockdown procedure is at least one communication secure lockdown procedure.

In some embodiments, the at least one secure lockdown procedure is at least one configuration secure lockdown procedure.

In some embodiments, the contextual communication awareness analysis is based, at least in part, on at least one of: at least one pre-determined communication sequence of a plurality of electronic messages and at least one pre-determined communication rate of the plurality of electronic messages.

In some embodiments, the at least one secure lockdown component is configured to analyze each electronic message based on at least one of: i) a bit-by-bit analysis and ii) a contextual communication awareness analysis.

In some embodiments, at least one operational configuration of the at least one ECU of the at least one network comprises at least one of: i) at least one approved hardware configuration of the at least one ECU and ii) at least one approved software configuration of the at least one ECU.

In some embodiments, the at least one processor of the at least one secure lockdown component is further configured, at runtime, to verify at least one of: 1) that the at least one approved software configuration, stored in the at least one non-volatile memory component, has not been modified; 2) that the at least one approved software configuration, loaded into a runtime memory, has not changed during the runtime; 3) that an approved memory map has not been invalidated, and 4) that a portion of the at least one non-volatile memory component, which stores the at least one approved hardware configuration has not been invalidated.

In some embodiments, the determination that the at least one unauthorized electronic message that would cause at least one unapproved change to or violate is based, at least in part, on at least one of: a pre-determined static state of the operational configuration of the at least one ECU and a runtime environment of the at least one ECU.

In some embodiments, for each of the all pre-defined valid messages, the at least one approved message dictionary database comprises at least one entry that defines: at least one approved message structure definition and at least one approved value of each message parameter.

In some embodiments, for each approved communication schema, the at least one approved communication schema database comprises at least one entry that defines at least one of: i) all approved sequences of electronic messages, ii) all approved source-destination pairs for each electronic message, iii) all approved communication rates, iv) all approved messaging activity protocols based on an internal state of the at least one network, v) all approved messaging activity protocols based on at least one external input associated with the at least one network, vi) all approved messaging activity protocols based on an internal state of the at least one ECU, vii) all approved messaging activity protocols based on at least one external input associated with the at least one ECU, and viii) any combination thereof.

In some embodiments, the at least one pre-defined state machine is configured to define at least one of: i) all approved sequences of electronic messages, ii) all approved source-destination pairs for each electronic message, iii) all approved communication rates, iv) all approved messaging activity protocols based on an internal state of the at least one network, v) all approved messaging activity protocols based on at least one external input associated with at least one network, vi) all approved messaging activity protocols based on an internal state of the at least one ECU, vii) all approved messaging activity protocols based on at least one external input associated with the at least one ECU, and viii) any combination thereof.

In some embodiments, the at least one securing lockdown component is configured to have at least one of the following logical layers: 1) a content logical layer that represents all pre-defined valid messages, 2) a routing logical layer that represents all approved source-destination pairs for each electronic message, and 3) a state logical layer that represents at least one of: i) all approved sequences of electronic messages, ii) all approved source-destination pairs for each electronic message, iii) all approved communication rates, iv) all approved messaging activity protocols based on an internal state of the at least one network, v) all approved messaging activity protocols based on at least one external input associated with at least one network, vi) all approved messaging activity protocols based on an internal state of the at least one ECU, vii) all approved messaging activity protocols based on at least one external input associated with the at least one ECU, and viii) any combination thereof.

In some embodiments, the at least one network resides within a vehicle.

In some embodiments, the at least one ECU is at least one electronic computing device configured to perform or affect at least one particular function in the vehicle.

In some embodiments, the all pre-defined valid messages are pre-defined based, at least in part, on a vehicle specification of a vehicle manufacturer or an ECU specification of the at least one ECU of an ECU manufacturer.

In some embodiments, the at least one secure lockdown component is further configured to: electronically obtain the vehicle specification from at least one trusted electronic source, and dynamically generate, based on the vehicle specification, at least one of: 1) the at least one approved message dictionary database, 2) the at least one approved communication schema database, and 3) the at least one pre-defined state machine.

In some embodiments, the at least one secure lockdown component is further configured to erase the at least one unauthorized electronic message.

In some embodiments, the at least one unapproved change is a change based, at least in part, on at least one cyber threat.

In some embodiments, the at least one secure lockdown component is further configured to generate at least one indication of the at least one unauthorized electronic message.

In some embodiments, the at least one secure lockdown component is further configured to add a metadata to each approved electronic message, wherein the metadata is configured to be recognized by at least one destination ECU as being approved by the device.

In some embodiments, the at least one network resides outside a vehicle.

In some embodiments, the at least one unauthorized electronic message is related to at least one cyber threat.

In some embodiments, the at least one secure lockdown component is configured to block the at least one unauthorized electronic message at one of: hardware, at least one location along a software stack, or both.

In some embodiments, the at least one pre-defined state machine is configured to implement at least one of: 1) the content logical layer, 2) the routing logical layer, and 3) the state logical layer.

In some embodiments, the at least one secure lockdown component is further configured to at least one of: log the at least one indication of the at least one unauthorized electronic message, and transmit the at least one indication of the at least one unauthorized electronic message to at least one external electronic destination that is outside the device.

In some embodiments, the at least one secure lockdown component is further configured to at least one of: generate at least one indication of at least one authorized electronic message; log the at least one authorized electronic message, the at least one indication, or both; and transmit the at least one indication of the at least one authorized electronic message to at least one external electronic destination that is outside the device.

In some embodiments, the present invention provides for a method that at least includes incorporating an exemplary inventive device into a vehicle, where the exemplary inventive device includes at least the following components: at least one secure lockdown component that is operationally associated with at least one electronic control unit (ECU) of at least one network; where the at least one ECU resides within the vehicle; where the at least one secure lockdown component is configured such that the device physically separates at least one of: i) the at least one network from any other network, ii) the at least one network from external inputs directed to the at least one network, iii) the at least one ECU from at least one other ECU, iv) the at least one ECU from external inputs directed to the at least one ECU, v) at least one memory component within the at least one ECU from at least one processing unit within the at least one ECU, and vi) any combination thereof; where the at least one secure lockdown component includes at least one processor programmed to execute at least one secure lockdown procedure and at least one non-volatile memory component, storing at least one: i) at least one approved message dictionary database, including entries for all valid electronic messages, ii) at least one approved communication schema database, including at least one entry for at least one approved communication schema, iii) at least one pre-defined state machine, iv) approved content of at least one memory component within the at least one ECU, and vii) approved configuration of at least one hardware unit within the at least one ECU; where the at least one processor of the at least one secure lockdown component is configured, at runtime, to execute the at least one secure lockdown procedure that is configured to: analyze each electronic message that is at least one of: i) directed to the at least one network, ii) transmitted within the at least one network, iii) to be externally transmitted from the at least one network to at least one external computing device, iv) directed to the at least ECU, or v) to be transmitted from the at least one ECU; vi) to be transmitted to the at least one memory component within the at least one ECU; vii) to be transmitted to configure at least one hardware component within the at least one ECU; where the at least one secure lockdown component is configured to analyze each electronic message based on at least one of: i) the at least one approved message dictionary database, including entries for all valid electronic messages, ii) the at least one approved communication schema database, including at least one entry for at least one approved communication schema, and iii) the at least one pre-defined state machine; identify, based on the analysis of each electronic message, at least one unauthorized electronic message that would cause at least one unapproved change to or violate at least one of: i) at least one operational configuration of the at least one ECU of the at least one network, ii) at least one communication schema that is utilized by the at least one ECU to communicate with at least one of: 1) the at one other ECU and 2) at least one external electronic computing device located outside of the at least one network, iii) the at least one approved message dictionary database, iv) the at least one approved communication schema database, v) the at least one pre-defined state machine, vi) the approved content of the at least one memory component within the at least one ECU; vii) the approved configuration of the at least one hardware unit within the at least one ECU; and block the at least one unauthorized electronic message from passing through the at least one secure lockdown component.

Illustrative Examples of Security Communication Lockdown Based on Static State Machine—Secured Network Orchestrator (SNO)

In some embodiments, to enforce the security communication lockdown, the exemplary inventive device configured to implement security communication lockdown is configured as a SNO component operating as the static (finite) state machine (e.g., a State/Event-based machine, an Unified Modeling Language (UML) state machine, a Specification and Description Language (SDL) state machine, a Touring machine, having the input/output tape be in the form of messages going in and out of the SNO component device through the communication interfaces). For example, as detailed herein, the security communication lockdown can be required based on a security threat of an external origin, an internal origin, or both. In some embodiments, to enforce the security communication lockdown, the exemplary inventive SNO component can be a physical ECU or a software component within already existing ECUs to enforce the at least one approved message dictionary database and/or the at least one approved communication schema database. In some embodiments, to enforce the security communication lockdown, the exemplary inventive SNO component is configured to be secure in itself and resistant to attacks which can modify its principle of operation. For example, the exemplary inventive SNO component is configured to include and secure the approved message dictionary database and/or the approved communication schema database, against modification during the runtime, thus upholding the static lockdown principles as defined herein. For example, the integrity of the exemplary inventive SNO component is configured to be verified and certified using suitable methods and standards such as ISO/IEC 15408.

Figure 9:
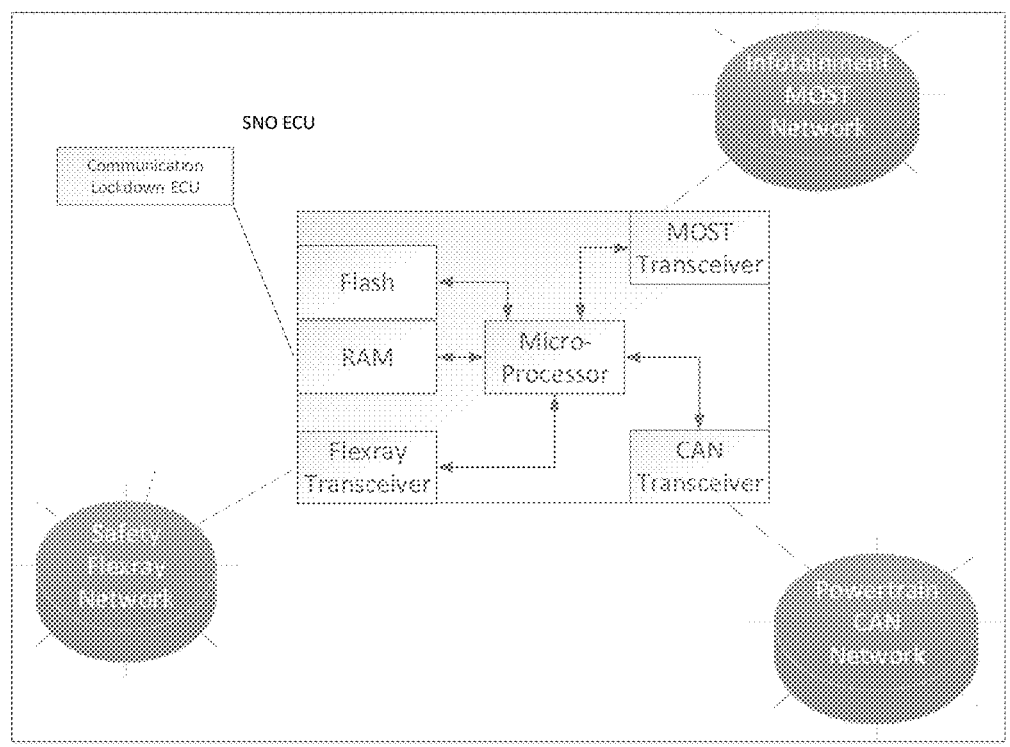

For example, the exemplary inventive SNO component, such as SNO ECU, can at least contain one or more processors (e.g., micro-processors), storage memory, run-time memory and hardware (e.g., hardware transceivers) which are typically required to communicate with the networks which interconnect through the exemplary inventive SNO component. For example, as illustrated in FIG. 9, the exemplary inventive SNO component can interconnect an Infotainment network based on MOST protocol, Powertrain network based on CAN protocol, and/or the Safety network based on FlexRay protocol.

In some embodiments, the exemplary inventive SNO component can be in the form of software component or a combination of software and hardware components. For example, the exemplary inventive SNO component can include a secure separation kernel, such as, but not limited to, as an operating system kernel, or a middleware between the hardware and the applications running on top of the hardware. In some embodiments, the secure separation kernel can be in the form of hardware and/or firmware and/or software mechanisms whose primary function is to establish, isolate and separate multiple partitions and control information flow between the subjects and exported resources allocated to those partitions. In some embodiments, the secure separation kernel is implemented in accordance with the Separation Kernel Protection Profile (SKPP) established by U.S. National Security Agency (NSA) (2007), whose specific description incorporated herein by reference. For example, the secure separation kernel of the exemplary inventive SNO component can be, or a specifically modified version of (modified in accordance with the principles of the present invention), one or more of the following separation kernels, but not limited to, including Green Hills' Integrity™ kernel, Wind River's VxWorks MILS™ kernel, and Lynx Software's LynxSecure™ kernel.

In some embodiments, the secure separation kernel's functionalities can include at least one of the following:
  separation of internal resources used by the Target of Evaluation Security Functions (TSF) from exported resources made available to subjects,
  partitioning and isolation of exported resources,
  mediation of information flows between partitions and between exported resources,
  audit services, and any combination thereof.

In some embodiments, to enforce the security communication lockdown, the secure separation kernel of the exemplary inventive SNO component is utilized to provide "application partitions," allowing several applications (e.g., processes) to run in their own virtual "compartments," where each application (e.g., process) can have dedicated resource(s) such as, but not limited to, a processor time and a memory allocation. For example, the exemplary inventive SNO component in the form of the inventive secure separation kernel separates the processor(s) and memory resource(s), and/or the use thereof, between several applications or application partitions (e.g., threads). In some embodiments, the secure separation kernel of the exemplary inventive SNO component can provide the separation between application partitions on at least two levels:
  1. Separation of processor time slots—each application partition shall have its own statically allocated time slot which will be enforced by the inventive secure separation kernel (i.e., when the time slot ends the next partition will be switched in according to a static scheduler); and
  2. Separation of memory address space—each application partition shall have its own memory address space and the inventive secure separation kernel is configured to enforce that each partition accesses only its allocated segment (e.g., memory address range).

In some embodiments, the secure separation kernel utilized in the exemplary inventive SNO component provides a secure isolation between applications or application partitions and thus prevent condition(s) under which they could affect one another (e.g., one infected program could infect another or one program crashing crashes another). For example, since both the processor and memory resources are separated, code from one partition cannot be read or written to the memory of a different partition. For example, due to the processor time separation, the secure separation kernel of the exemplary inventive SNO component can facilitate a scenario when a first code from one partition can deny the execution of a second code from a different partition since they are scheduled by the inventive secure separation kernel, and thus the operation of the inventive secure separation kernel prevents a denial of service attack by one partition on another. For example, even if a malicious code gets into one partition, the malicious code cannot spread or affect other partitions. In some embodiments, the secure separation kernel of the exemplary inventive SNO component can provide sufficient security protection without going into hardware separation (e.g., separate processor, memory and other components for a set of application partitions or a set of applications,).

In some embodiments, the secure separation kernel of the exemplary inventive SNO component is configured to allocate all exported resources under its control into partitions. In some embodiments, the secure separation kernel of the exemplary inventive SNO component can maintain the partitions isolated except for explicitly allowed information flows. In some embodiments, the secure separation kernel of the exemplary inventive SNO component is configured to isolate actions of a subject in one partition from (i.e., cannot be detected by or communicated to) subjects in another partition, unless that flow has been allowed. In some embodiments, the terms "partition" and "subject" are orthogonal abstractions. For example, the term "partition," as indicated by its mathematical genesis, can provide for a set-theoretic grouping of system entities, whereas the term "subject" can be utilized to describe and implement individual active entities of a system. For example, a partition (a collection, containing zero or more elements) is not a subject (an active element), but may contain zero or more subjects.

Figure 10:
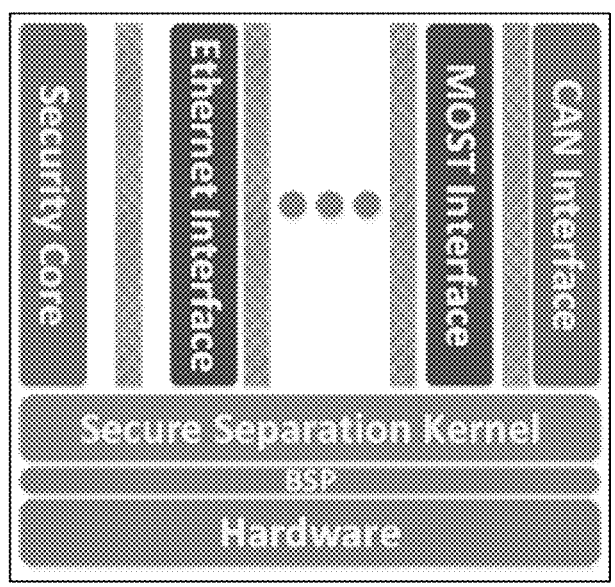

In some embodiments, to manage the partitions and the flows, the secure separation kernel of the exemplary inventive SNO component is configured to rely, at least in part, on the inventive state machine and/or the approved message dictionary database, and/or the approved communication schema database, which are parts of the item designated as "security core" in FIG. 10. For example, the secure separation kernel of the exemplary inventive SNO component can be configured to run directly on top of the hardware (e.g., processor, memory, etc.), and/or to be part of a firmware package (referenced herein as "Board Support Package" or "BSP") which provides drivers and low level software interface to the various hardware components, and/or to run directly on top of the BSP (as illustrated in FIG. 10), between BSP and software interfaces for various communication networks/programs.

For example, the secure separation kernel of the exemplary inventive SNO component can be part of or run on top of the Wind River™ board support package (BSP) for the ARM Integrator 920T board which can contain, among other things, at least the following elements:

config.h file, which defines constants such as ROM_SIZE and RAM_HIGH_ADRS

Makefile, which defines binary versions of VxWorks ROM images for programming into flash memory bootrom file, which defines the boot line parameters for the board target.ref file, which describes board-specific information such as switch and jumper settings, interrupt levels, and offset bias VxWorks image Various C files, including:

flashMem.c—the device driver for the board's flash memory pciIomapShow.c—mapping file for the PCI bus primeCellSio.c—TTY driver sysLib.c—system-dependent routines specific to this board romInit.s—ROM initialization module for the board; contains entry code for images that start running from ROM.

For example, the inventive modified BSP is configured to perform at least the following operations:

Initialize the processor
Initialize the bus
Initialize the interrupt controller
Initialize the clock
Initialize the RAM settings
Configure the segments
Load and run bootloader from flash.

In some embodiments, to enforce the security communication lockdown, the secure separation kernel of the exemplary inventive SNO component is configured as part of a micro kernel which at least includes elements necessary to run an application (e.g., memory management routine(s) and a process scheduler). In some embodiments, the exemplary inventive SNO component is configured so that the user can add non-security components at the user-space.

In some embodiments, the secure separation kernel of the exemplary inventive SNO component can allow each communication interface to have a separate partition which manages its interaction with the exemplary inventive SNO component configured to enforce the security communication lockdown. For example, the communication interface can be software (e.g., a daemon [UNIX service] and/or a service) which implements a necessary logic required to send and receive data via the corresponding hardware interface.

In some embodiments, the secure separation kernel of the exemplary inventive SNO component is configured to contain the necessary function and drivers to send commands through the operating system to the low-level firmware BSP which relays it to the hardware. For example, the secure separation kernel of the exemplary inventive SNO component 1 is configured to process messages from software interfaces such as, but not limited to, UNIX sockets and the UNIX TCP/IP stack, and the low-level firmware BSP. For example, the secure separation kernel of the exemplary inventive SNO component is configured to prevent, for example, 1) an injection of unauthorized code or data through the UNIX sockets and/or the UNIX TCP/IP stack to affect/manipulate/change the BSP and/or hardware, and 2) unauthorized data leakage between the UNIX sockets and/or the UNIX TCP/IP stack and an operating system.

In some embodiments, the secure separation kernel of the exemplary inventive SNO component allows the exemplary inventive SNO component to handle all communication interfaces in a single partition rather than a separate partition for each. In some embodiments, the secure separation kernel of the exemplary inventive SNO component is configured to run in at least one dedicated partition.

Figure 11:
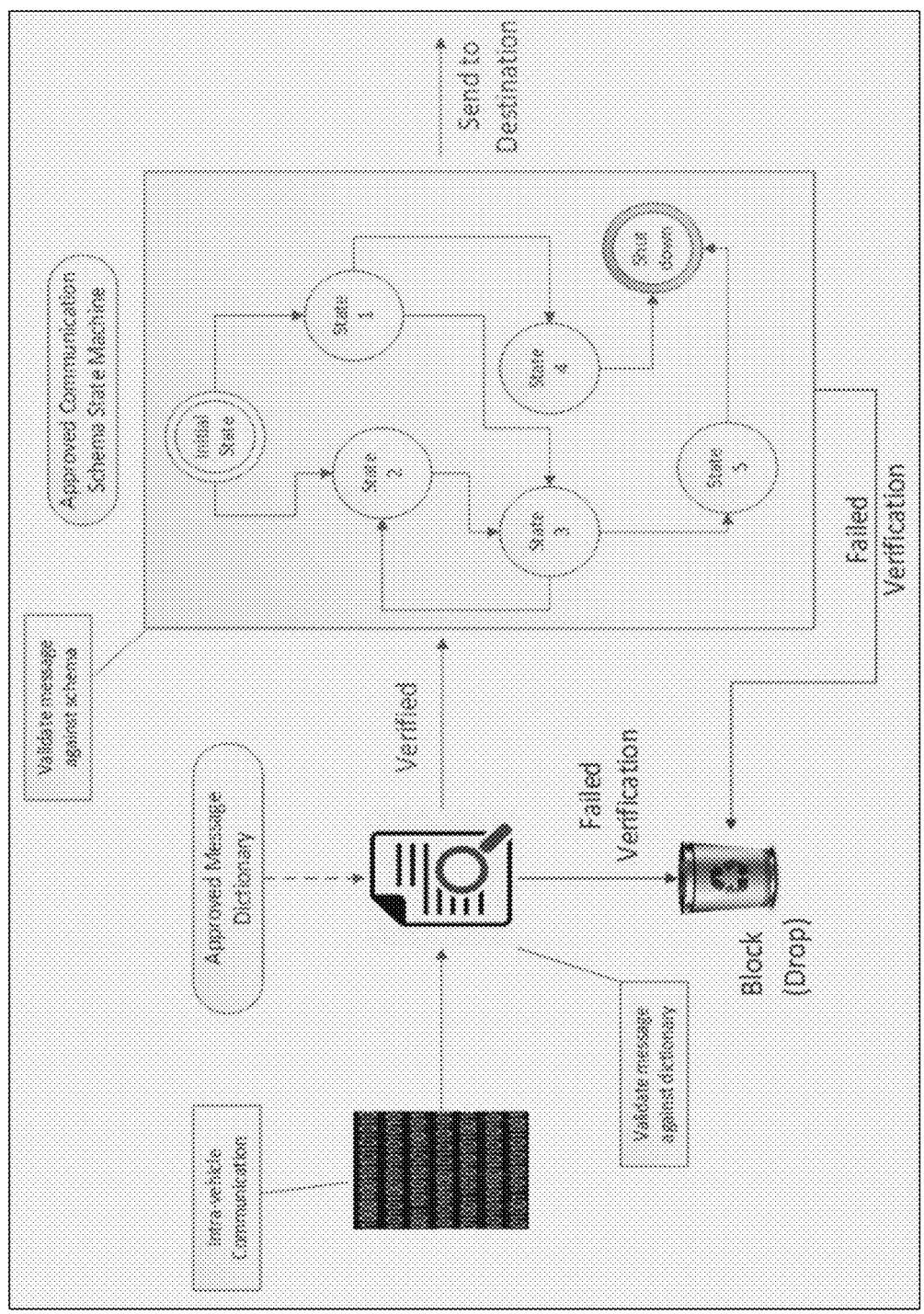

In some embodiments, in addition to the secure separation kernel, the exemplary inventive SNO component is configured to contain an exemplary inventive finite state machine, illustrated in FIG. 11, which is configured in accordance with the principles of the present invention detailed herein to deterministically and statically govern any communication passing through.

In some embodiments, as illustrated in FIG. 11, the exemplary inventive SNO component is also configured to include the approved message dictionary database and/or the approved communication schema database to enforce the secure communication lockdown and verify each communication which may be configured, but not limited to, as the three logic layer model described herein. For example, each communication which is received is either blocked (dropped) or allowed to continue to its destination. For example, the finite state machine of the exemplary inventive SNO component defines each current context in which a particular communication is received by the exemplary inventive SNO component (e.g., state of the vehicle/ECUs within vehicle networks). For example, the exemplary inventive SNO component is configured to perform the initial verification by comparing the received communication to the approved message dictionary database and/or the approved communication schema database for such respective communication. For example, the approved message dictionary can be stored in at least one local database which contains an entry for every approved message, for example but not limited to, on the bit level (e.g., the bitwise representation of all of the fields of the message with their approved value(s)). For example, the exemplary inventive SNO component is configured to further verify the communication schema by using the finite state machine and the approved communication schema database. For example, to verify a communication schema of the received message against the approved communication schema database, the exemplary inventive SNO component checks whether, in the current state of the state machine (which can represent the context and/or the current state of all relevant ECUs within a particular environment (e.g., the vehicle)), the received message is allowed to be transmitted from the source ECU to the target ECU. If the state dictates that it is allowed, the exemplary inventive SNO component is configured to complete the verification and send the message to the target ECU; otherwise, the exemplary inventive SNO component is configured to block (drop) the message, thus preventing an attack.

For example, in some embodiments, the source and destination of the message are considered to be a part of the message and its context and be verified by comparing with the approved message dictionary database and/or the approved communication schema database in order to verify the message. For example, as illustrated in FIG. 11, the exemplary inventive state machine includes any vehicle parameter which governs the set of approved messages which can be sent at a given moment (i.e., the exemplary state machine defines the overall state of the vehicle). For example, each state vector can contain states of all ECUs or at least a portion of all relevant ECUs within the vehicle at a particular operational time (e.g., on, idle, open, closed or any other similarly quantifiable measure(s)). For example, the exemplary inventive state machine can also contain a pre-configured logic defined by a pre-determined authority (e.g., the manufacturer). An example of the pre-configured logic can be: an ECU A is tuned on so ECU B must start an operation although no communication through a relevant network has been sent because the ECU A has been turned on via a dedicated signal pathway between the ECU A and the ECU B.

Figure 12:
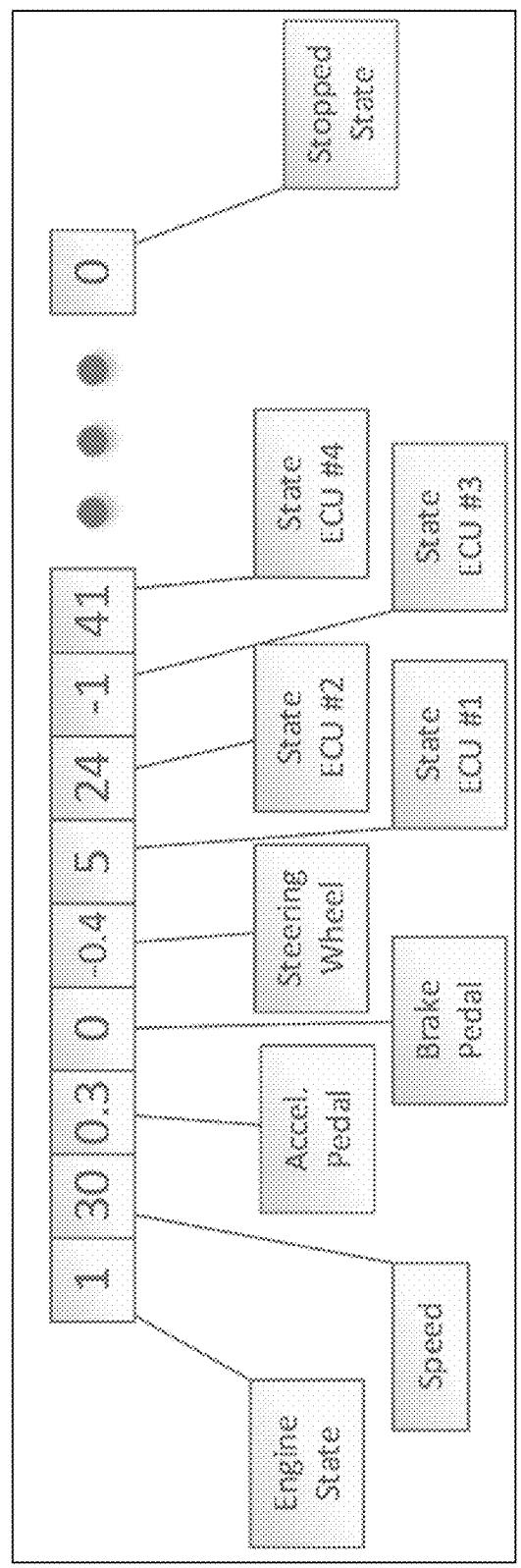

For example, as illustrated in FIG. 12, any state within the exemplary inventive state machine can be represented using at least one state vector. In some embodiments, each state vector can contain all or at least a relevant portion of vehicle parameters which define the vehicle's state at a given time point and a possible combination of values. For instance, a state vector can include the current speed as reported by the engine ECU, the state of the pedals as reported by their dedicated ECU and the state of any other relevant additional ECU which can be communicated in a quantifiable form.

In some embodiments, for each state (and the state vector which defines it), there is a list defining all valid messages which are approved for it (including their source and destination as part of the message). In some embodiments, the list is implemented in the form of state transitions, where each valid message causes as a transition from the current state to another state. For example, in some embodiments, when a received message is present in the approved message dictionary database, however the exemplary inventive SNO component determines that there is no suitable transition from the current state which corresponds to the received message, the exemplary inventive SNO component is configured to drop the message (it is not verified according to the approved communication schema). Accordingly, for such embodiments, the state machine is configured performs the role of the approved communication schema database. For example, the approved state machine can be locally stored in memory within at least one database containing an entry for each state and a list of approved transitions set as described herein.

For example, in some embodiments, each legal message corresponds to a state transition, resulting in numerous states to account for all approved messages. Consequently, the unverified (illegal) message will not cause the state transition.

For example, in some embodiments, each stored state contains and/or is associated with a list of all messages which are allowed for such state. For example, some message(s) of the list of the allowed message cause(s) a state transition.

For example, in some embodiments, the exemplary inventive SNO component is configured to store the current state in the runtime memory and access it when any new communication arrives in order to verify such communication.

In some embodiments, once a transition occurs (e.g., the received message has been verified and transmitted), the exemplary inventive SNO component is configured to update the current state. For example, FIG. 13 illustrates an example of a communication with a series of messages which can be received by the exemplary inventive SNO component, and their verification process utilizing the exemplary inventive state machine.

In some embodiments, in accordance with the principles of the present invention, the exemplary inventive state machine is generated by analyzing each ECU specification to determine the various states such ECU can be in and which parameters change these states. For example, the fact that the vehicle is moving at all is a state on its own since the engine cannot be turned off while the vehicle is moving. For example, the various parameter(s) of the vehicle which are critical to state transition(s) (speed, accelerator pedal position, etc.) can also be included in each state vector.

In some embodiments, in accordance with the principles of the present invention, the exemplary inventive state machine is therefore derived from a plurality of state vectors, where each unique combination of the various states in a particular state vector is represented as a single state in the machine. For example, in some embodiments, some general parameters of the vehicle (e.g., speed, etc.) can be disregarded to minimize the amount of states. For example, as detailed above, for each state, based on the specification, there can be the list of all the approved messages from the approved message dictionary which are valid in this state.

Figure 13:
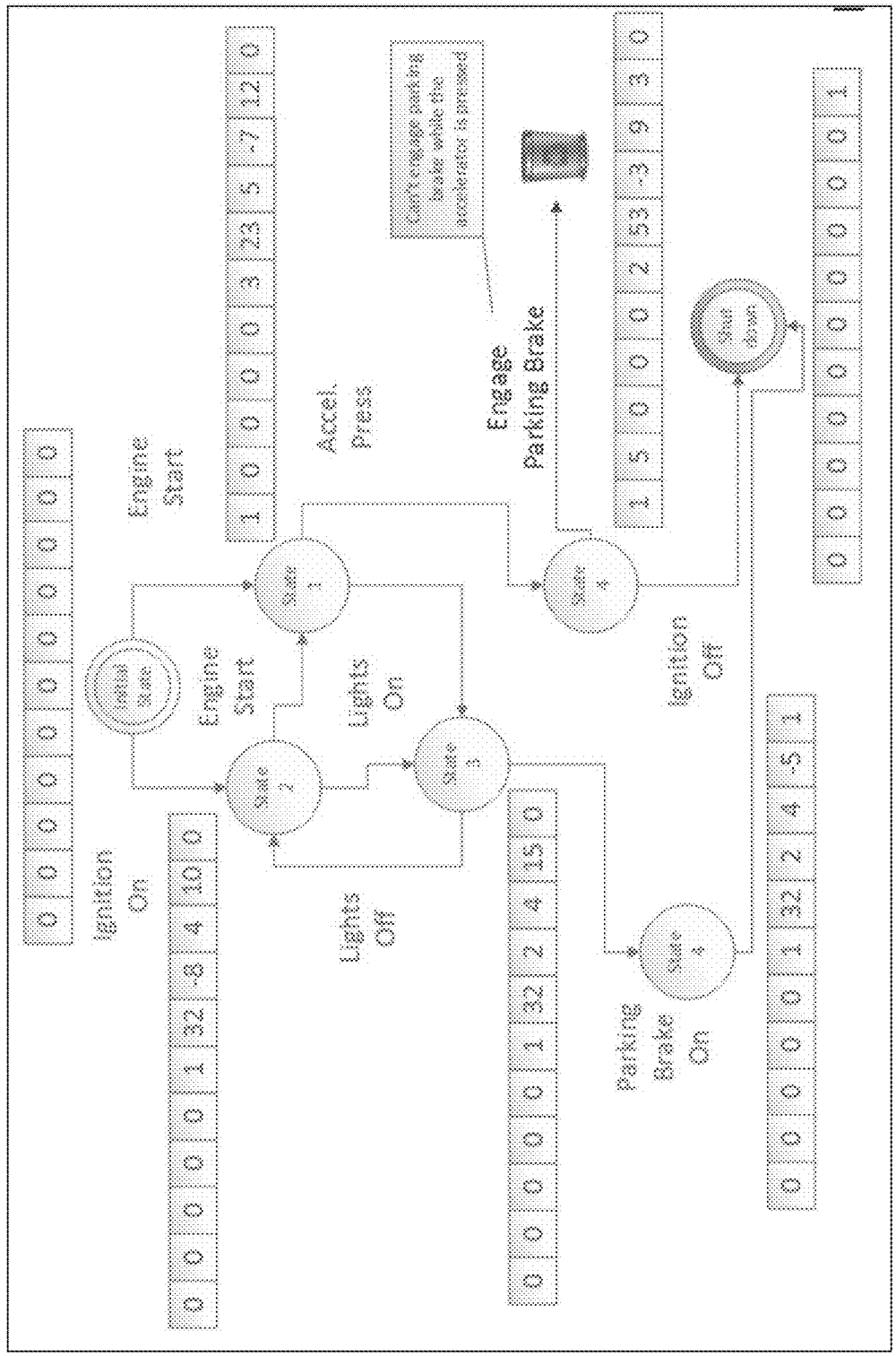

In FIG. 13, each state in the state machine is illustrated with the corresponding state vector next to it. As illustrated in FIG. 13, the example communication(s) received by the exemplary inventive SNO component can indicate that the vehicle being started (i.e., the "start" command sent from an instrument cluster ECU to an engine ECU), the accelerator pedal being pressed and a message being sent from the pedal ECU to the engine ECU, and then the vehicle being turned off by the instrument cluster ECU. If at some point during the progressions shown in FIG. 13, the exemplary inventive SNO component receives a hand brake message from the electronic hand brake ECU when the state of the exemplary inventive state machine identifies that the accelerator pedal is pressed, the exemplary inventive SNO component is configured to block the hand brake message (thus blocking an attack) since no transition exists from the state 4 which corresponds to the hand brake message.

In some embodiments, the exemplary inventive SNO component is configured to utilize the exemplary inventive state machine, illustrated in FIG. 13, as the approved communication schema database, and enforce it. For example, every time a communication is received and verified as being approved, the exemplary inventive SNO component is configured to update its state machine to the new state according to the message received. Consequently, a log of updates made to the state of the exemplary inventive state machine is representative of the history of previous communications.

Figure 14:
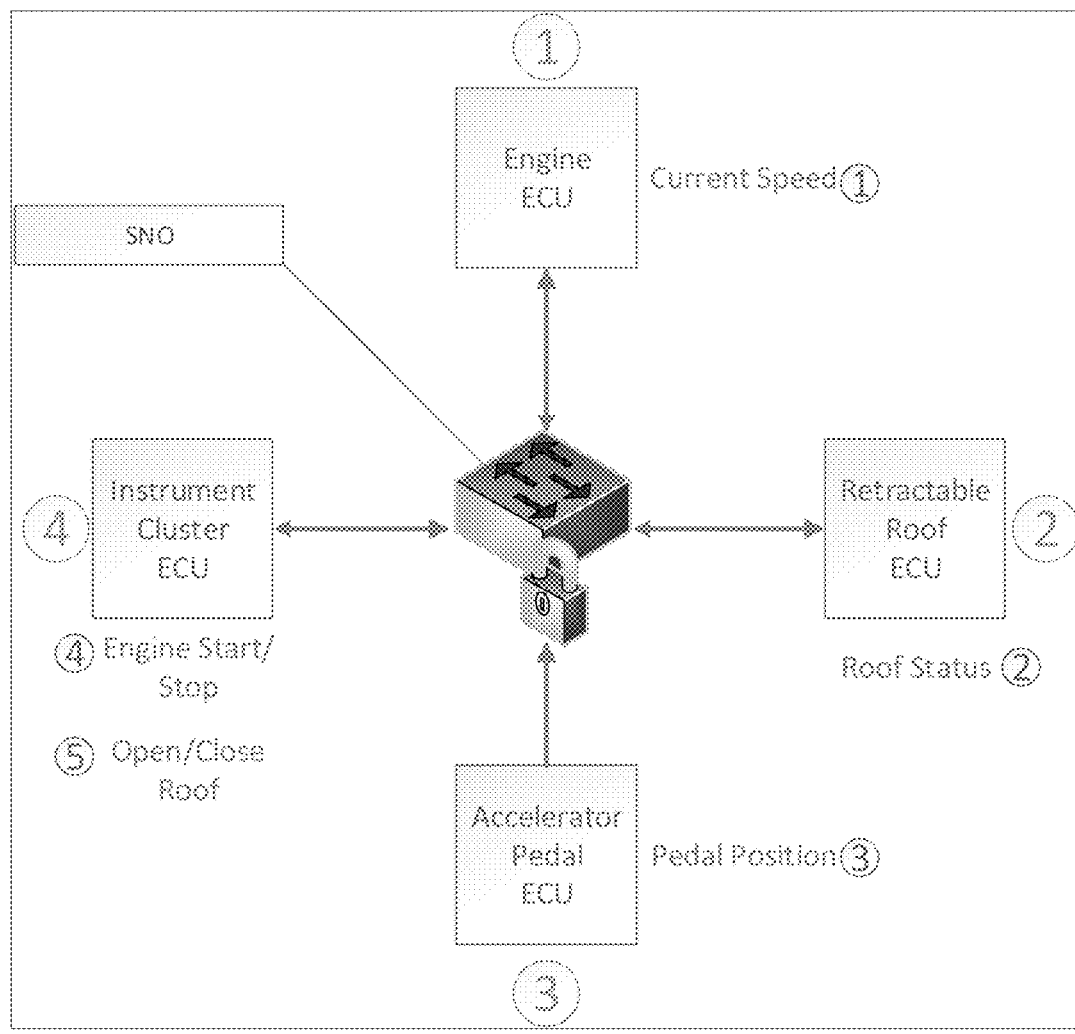

FIG. 14 illustrates an example of an illustrative operation of the exemplary inventive SNO component in a scenario of a convertible vehicle with the functionality to open and close the roof. For example, due to mechanical reasons, the roof can be opened and closed only below 30 miles per hour (mph). In this particular example, the ECUs involved are, for example, the Engine ECU which calculates the current speed and sends a message the current speed data to other ECUs in the vehicle, the retractable roof ECU which controls the retractable roof operation, the accelerator pedal ECU which send the command to accelerate, and the instrument cluster ECU which has all of the controls to start and stop the engine, and open and close the roof while displaying the current speed to the driver. In addition, for this illustrative example, to turn off the vehicle, the roof must be closed.

In this illustrative example, each ECU has an ID (shown in a large-sized circle next to the corresponding ECU) and each message type has an ID (shown in a small-sized circle next to the corresponding message). In this illustrative example, as illustrated in FIG. 15, an exemplary approved communication protocol/schema is defined to consist of four fields for each message: Source ECU, Destination ECU, Message ID and value which is sent. Each field is 8 bits long. For this illustrative example, the source and destination ECU values are 1-4; the message ID values are 1-5.

For this illustrative example, an approved authority (e.g., manufacturer) can provide the following specification for relevant ECUs. The engine ECU updates the instrument cluster and the retractable roof ECU with the current speed which is defined in the range of 0-250 mph. The retractable roof ECU updates the instrument cluster with the current state of the roof (0=closed, 1=open). The accelerator pedal ECU updates the engine ECU with the current position of the pedal defined by a continuous value between 0-1 which 1 is fully depressed and 0 is not depressed at all. The instrument cluster ECU sends engine start/stop commands and roof open/close commands to the engine and retractable roof ECUs respectively. In this example, the above exemplary specification is translated into the approved message dictionary, depicted in FIG. 16, which is then stored in at least one database which is stored within the exemplary inventive SNO component and/or accessed by the exemplary inventive SNO component.

Figures 16, 17:
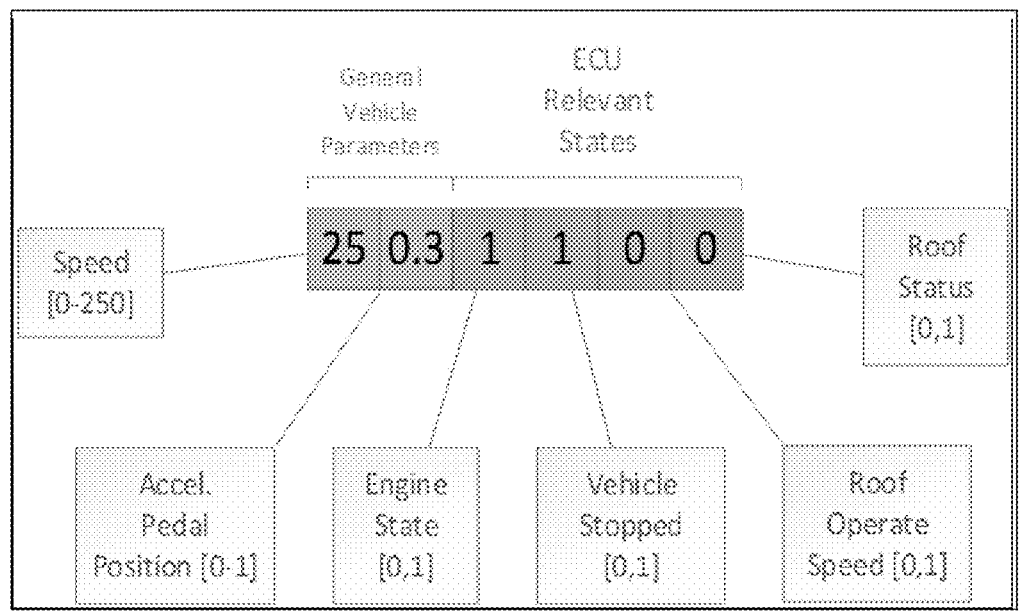

As shown in FIG. 16, the exemplary "engine start" command is defined with value 1 and the exemplary "engine stop" with value 0; respectively, the exemplary "roof open" command is defined with value 1 and the exemplary "roof close" command is defined with value 0. For this specific example, each state vector for the exemplary finite state machine of this example is generated by deriving all relevant states which the various ECUs can be in (the conditions under which their mode of operation changes according to the specification). FIG. 17 shows an illustrative state vector for this specific example.

Figure 18:
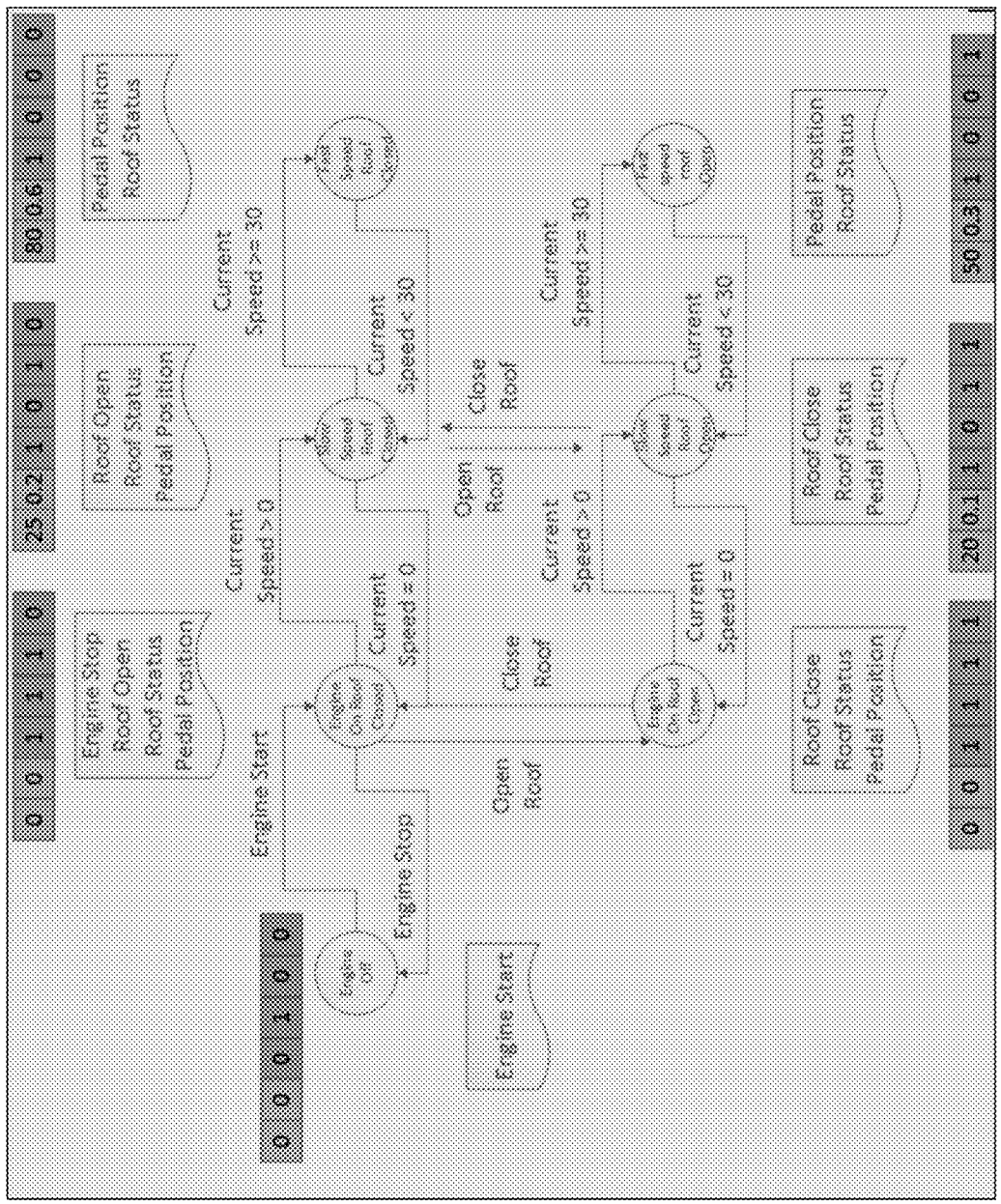

For example, the retractable top ECU changes state when the speed goes above 30 mph and when it goes below 30 mph from above 30 mph. Thus, the state vector will contain a state which tells is whether the vehicle is at a speed where the roof can be operated (a "slow speed" state) or not (a "fast speed" state). FIG. 18 illustrates a schematic representation of the exemplary inventive state machine adopted for this specific example. FIG. 18 illustrates that each state has a corresponding state vector. For example, an exemplary state transition is done when at least one specific message with a specific value is received by the exemplary inventive SNO component. The exemplary inventive SNO component the updates the respective state vector with each validated message (even if a state change did not occur, e.g. speed went up from 20 to 22 mph).

In addition to enforcing the messages being sent in context, the exemplary inventive SNO component utilizing the state machine can also enforce (prevent) illegal value changes which are attempted without state transitions. For instance, the authority (e.g., manufacturer) may decide that the speed value can be updated only when the change is more than 5 mph, when the exemplary inventive SNO component receives a message which carries a new speed value, the exemplary inventive SNO component analyzes the message based on the exemplary state machine to determine if the new speed value differs from the current speed value in the current state vector by more than 5 mph. If the new speed value does not differ by more than 5 mph, the exemplary inventive SNO component is configured to discard the message. Thus, the exemplary inventive SNO component safeguards the integrity of the current state using the state vector.

Table 1 show an exemplary code which is executed by the exemplary inventive SNO component when the exemplary inventive SNO component receives a message received while the exemplary state machine is in the "Engine On Roof Closed" state, identified in FIG. 18.

In some embodiments, the inventive specially programmed computing systems can include a separate finite state machine configured for each pair of ECUs who communicate with each other, resulting in a network of specialized state machines. In some embodiments, the inventive specially programmed computing systems can include a separate finite state machine configured for each pair of communication networks are jointly utilized to exchange messages between various ECUs. In some embodiments, the inventive specially programmed computing systems can include a separate finite state machine for each process in the vehicle can be used. For example, in the above example with the retractable roof, a separate finite state machine is defined for the operation of the retractable roof. In such case, the exemplary inventive SNO component(s) can be configured to update states of several state machine for each message received.

In some embodiments, the inventive specially programmed computing systems can include an automatic tool which electronically acquires, for example, a manufacturer specification and generates a particular approved message dictionary, each specific state vector and a corresponding state machine. For example, the automatic tool can acquire the specification which is encoded in a tagged language (such as XML).

In some embodiments, the inventive specially programmed computing systems and associated inventive devices configured to enforce the security communication lockdown are fully deterministic, can be fully analyzed using a computer program and easily certified for safety and security. For example, an exemplary analysis can verify that under each particular input a particular inventive state machine will not enter an undefined state and/or unauthorized state and that the particular inventive state machine and a corresponding inventive SNO component(s) behave according to predefined specifications.

In some embodiments, the inventive specially programmed computing systems and associated inventive devices configured to enforce the security communication lockdown can include a partial state machine which covers only a portion of all possible states of the vehicle which can be defined based on the manufacturer's specification, and each communication which doesn't match any state is either dropped or allowed by the lockdown device, as long as each message related to the communication can be verified against the approved message dictionary database.

TABLE 1

```
BOOL CheckMessage_EngineRoofClosed(Message m)
{
    if (CheckMessageInApprovedDictionary(m) !=(TRUE) //
    Check message appears in approved message dictionary
        return FALSE;
      if(m.MessageID == 2 && m.SourceECU == 2)
    {
        UpdateStateVector(m); // Update the state vector with
        the current state
        return MessageSend(INSTRUMENT_CLUSTER_ECU, m);
        // If message contains roof status send it to the instrument
        cluster for display
    }
    if(m.MessageID == 3 && m.SourceECU == 3)
    {
        UpdateStateVector(m); // Update the state vector with
        the current state
        return MessageSend(ENGINE_ECU, m); // If message
        contains updated accelerator pedal position,
        send it to engine ECU
    }
    if (m.MessageID == 4 && m.SourceECU == 4) // Engine start/
    stop message
    {
        if (m.Value == 0)
        {
            if(MessageSend(ENGINE_ECU, m) == TRUE); // If message
            contains stop command send it to engine ECU
            {
                CurrentStatus = ENGINE_OFF; // If message sent
                successfully to engine move state to Engine Off
                UpdateStateVector(m); //Update the state vector
                with the current state
                return TRUE;
            }
            else
                return FALSE; // Operation not completed successfully
        }
        else
            return FALSE; // Engine already started
    }
    if(m.MessageID == 5 && m.SourceECU == 4) //
    Roof open/close message
    {
        if (m.Value == 1)
        {
            if(MessageSend(RETRACTABLE_ROOF_ECU_, m) ==
            TRUE); //
            If message contains open command send it to retract roof
    ECU
            {
                CurrentStatus = ENGINE_ON_ROOF_OPEN; //
                If message send successfully move state to open
                roof state
                UpdateStateVector(m); // Update the state vector
                with the current state
                return TRUE;
            }
            else
                return FALSE; // Operation not completed successfully
        }
        else
            return FALSE; // Roof already closed
    }
    return False
}
```

In some embodiments, the inventive specially programmed computing systems and associated inventive devices configured to enforce the security communication lockdown (the inventive lockdown devices) are further configured to also implement protocol translation capabilities where they can serve as the data interpreter between the communication networks connected to them. For example, after a message is validated, the inventive lockdown devices can be configured to translate the message based on a communication protocol of a receiving network and/or ECU. For example, if the message is valid, the inventive lockdown devices can translate a particular message from the MOST protocol to the CAN protocol.

In some embodiments, the inventive lockdown devices can be configured to hold a secure memory which store at least one cryptography key of suitable kind and/or other similar security related data such as security certificates. In some embodiments, the inventive specially programmed computing systems can be configured to utilize cryptography keys and/or certificates for internal and/or external ECU communications or any other suitable purpose such as, but not limited to, vehicle identification for online payments, authentication and encryption for vehicle to vehicle communication, authentication of updates received from the manufacturer, effectively serving as a Trusted Platform Module (TPM) for other ECUs.

In some embodiments, the inventive lockdown devices can be configured to employ encryption and/or authentication scheme(s) at either network level and/or individually ECU level, thus allowing for terminating encrypted communication and starting another one to the destination or any other combination of session encryption and authentication networks connected to it.

For example, in some embodiments, an exemplary inventive lockdown device, which is connected to an automotive infotainment MOST network and a critical safety LIN network, can be configured, based on, the manufacturer's request to deny all communications between the MOST network and the safety LIN network by even though both networks belong to the same vehicle. In another example, the exemplary inventive lockdown device can be configured to allow telemetry data, specified by the manufacturer, that is generated at a specific ECU connected to an engine management CAN network to be communicated into the MOST network in order for it to display that data graphically on the infotainment screen.

In another example, the inventive lockdown devices can be configured to protect a privacy of a user of a vehicle. For example, a vehicle may be programmed to place an automatic emergency service call (e.g., transmit an electronic report) via a wireless 3G modem incorporated into the vehicle. In case of an accident, the vehicle can place can the automatic emergency service call to inform the authorities about an accident in an instant and with no regard to the user's condition. For example, such report may contain a location of the vehicle determined via on-board GPS receiver, the user's or owner's personal information such as, but not limited to, age, sex, residency, phone number and/or the user's medical condition. For example, such report may also contain data regarding the vehicle itself such as make, year, VIN (Vehicle Identification Number), license plate, airbag deployment status and/or telemetry data of the last 2 minutes. For example, the report can include enough information to determine the time and location of the accident, severity, probable medical profile of the injured, the vehicle to look for and family to contact which will allow the emergency response teams to perform their duties with improved efficiency. Such detailed description of the scene and those likely involved raise serious privacy concerns.

For example, in case of an accident, the following may occur:
1. a sensor residing in the "safety network" (which is connected to the communication lockdown ECU) detects an accident and the ECU assigned to the task prepares the report for the authorities. The report is received by the lockdown ECU and verified according approved message dictionary and communication schema.

2. The ECU establish an internal communication with the communication lockdown ECU containing (or directly connected to) the 3G modem via CAN bus interface and transmits the report to it.
3. The communication lockdown ECU establishes a new encrypted connection to an authenticated remote emergency notification server and sends the report.

In this scenario, in accordance with some embodiments, the sensitive information travels unencrypted on the on-board networks, but is verified, encrypted and transmitted to the right external destination by the inventive lockdown devices.

In some embodiments, a physical housing in which the inventive lockdown device(s) reside can include temper-proofing measures which can detect that the physical housing has been opened or breached (e.g., utilizing micro-switch sensors, optical sensors and other similarly suitable techniques/devices) and securely erase all software and data stored in the inventive lockdown device(s).

In some embodiments, the inventive lockdown devices can be configured to authenticate and/or verify external software packages which need to be deployed within the vehicle. For example, the inventive lockdown devices can be configured to verify the cryptographic signature of the external software packages, unencrypt them and deploy them in the approved ECU(s) only.

In some embodiments, when ECUs are utilizing a session based communication protocol which requires acknowledgments of communication being received, the inventive lockdown devices can be configured to block the communication and then send a notification to the sending ECUs that the message was not received.

In some embodiments, the inventive lockdown devices can be deployed to protect a single communication link (between and single ECU and the network).

In some embodiments, the inventive lockdown device and the inventive state machine can take into account states of external systems which are communicating with the vehicle through an external communication interface (e.g. 3G cellular, Wi-Fi, etc.).

Illustrative Examples for Configuration Lockdown of ECUs Based on Static Runtime Environment Enforcer (SREE)

In some embodiments, to enforce the security configuration lockdown for automotive ECUs, or any computing system, the exemplary inventive lockdown device(s) can include and/or is/are configured as inventive SREE component(s) which securely validate(s) all memory access to ensure that the approved software package(s), approved memory map(s), and/or approved hardware configuration(s) are not modified during the runtime.

In some embodiments, an exemplary inventive SREE component can be implemented as a hardware component (whether an application-specific integrated circuit (ASIC) or a field-programmable gate array (FPGA)) which is located immediately before the runtime and storage memory, interconnected directly to the memory components (without any other devices being directly connected to them (i.e., being physically non-bypassable), and which verifies all memory accesses. In some embodiments, the exemplary inventive SREE component can be implemented as a firmware component to securely enforce the memory lockdown. In some embodiments, the exemplary inventive SREE component can be implemented as the combination of the hardware and the firmware.

In some embodiments, the exemplary inventive SREE component is configured to protect the associated computing system(s) from malicious software the runs on top of the operating system, as a separate application and/or inject itself as part of another application. In some embodiments, the exemplary inventive SREE component is configured to protect the associated computing system(s) from the malicious software's abilities to gain access to secure resources through a process called "privilege escalation". Typically, the "privilege escalation" requires attacking the operating system core (or kernel) to gain the same level of access as the operating system core. In some embodiments, the exemplary inventive SREE component is configured to be part of a layer of BSP (Board Support Package) firmware which resides below the operating system core software. For example, typically, in embedded systems, it is referred to as BSP and in PCs is referred to as BIOS (Basic Input/Output System). As referenced here, the term "BSP" includes any type of middleware which resides between an operating system and hardware (which includes the bootloader). As detailed above, BSP is a set of drivers which provide an interface for the operating system to access the hardware components of the computing system. As detailed above, typically, the BSP can include drivers for processor access (e.g., architecture support package (ASP)), drivers for memory access (the memory management unit, storage memory, and runtime operational memory) and/or drivers for peripheral devices (e.g., network card, video card, USB controller, etc.). As detailed above, for example, within the Wind River's BSP for ARM Integrator 920T board, the flashMem.c file contains device driver for the board's flash memory and romInit.s file contains ROM initialization module for the board, software images that start running from ROM. In some embodiments, the exemplary inventive SREE component is configured to implement the ECU lockdown principles detailed herein independently and agnostically from any operating system.

Figure 19:
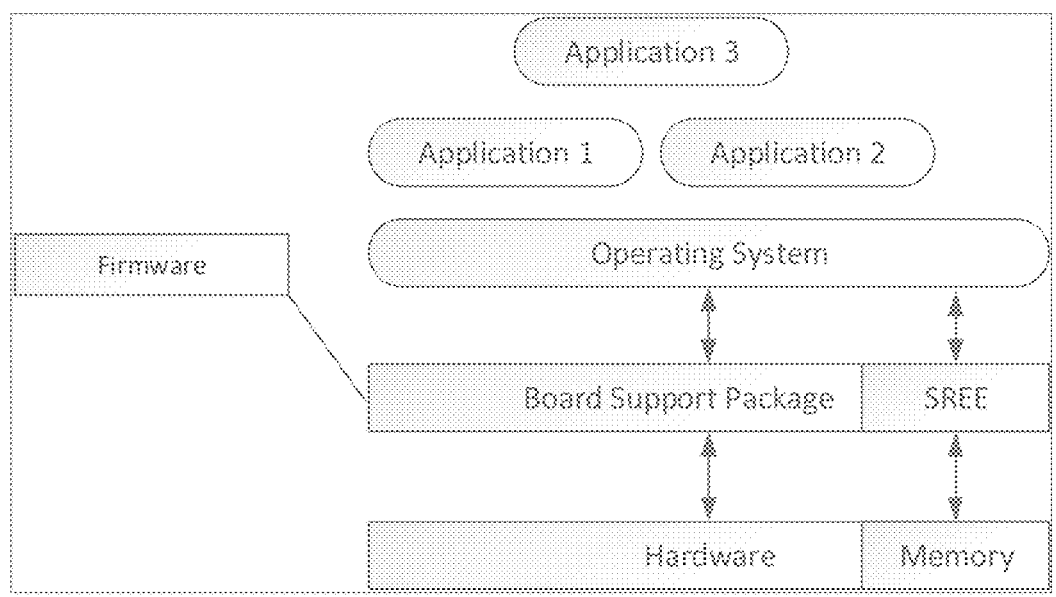

For example, as illustrated in FIG. 19, the exemplary inventive SREE component is implemented as an integral component of the BSP so that all memory access operations are routed through the exemplary inventive SREE component. In some embodiments, the exemplary inventive SREE component is configured to decide whether to allow the execution of the memory access operations or to block them, thus essentially blocking an attack. In some embodiments, the exemplary inventive SREE component is configured to make its determination based, at least in part, on one or more of the following criteria: a type of memory request (e.g., read or write), a target memory (e.g., storage or runtime) and/or specific memory address or a memory address range which is being sought to access.

Figure 20:
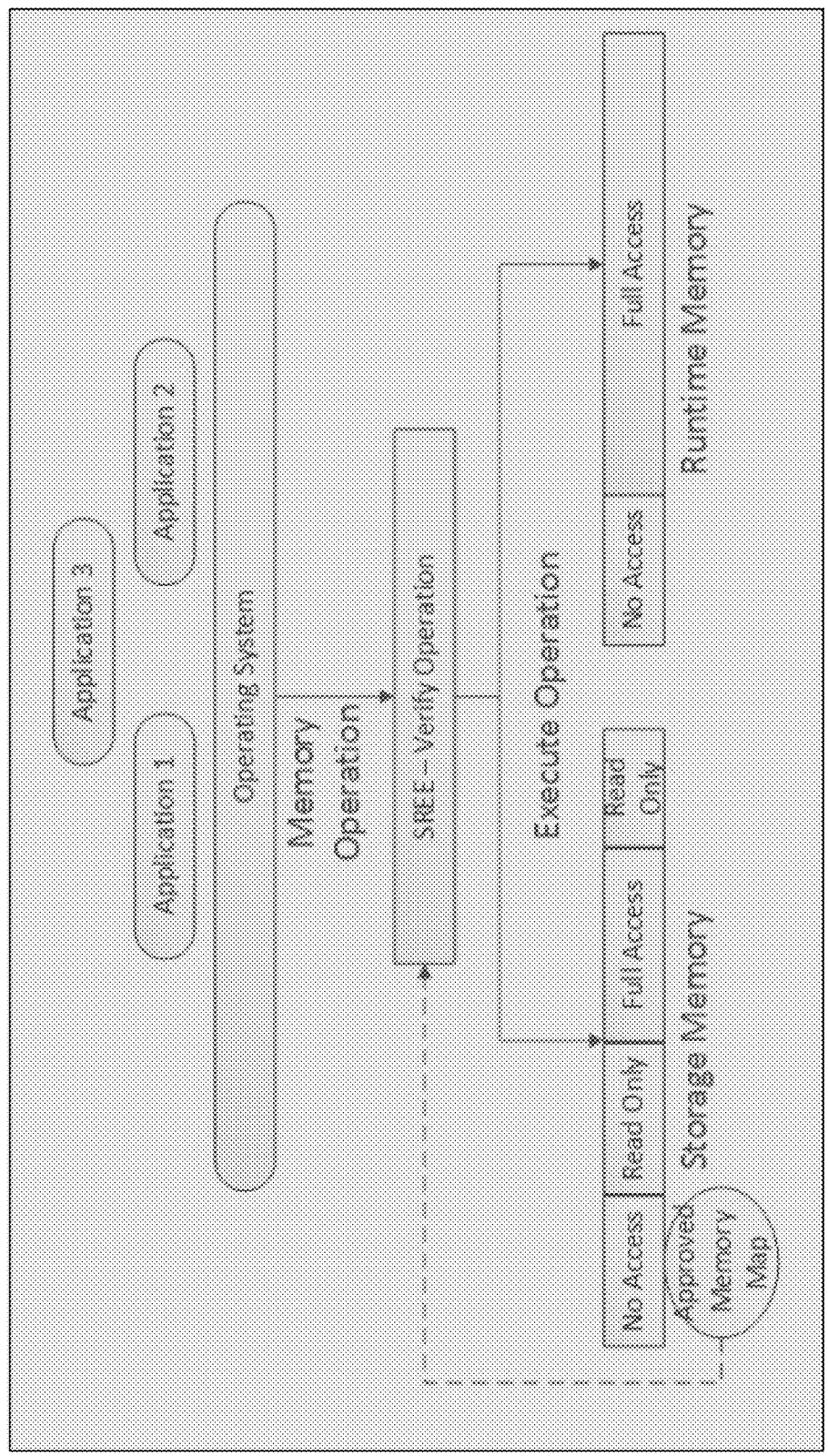

In some embodiments, the exemplary inventive SREE component is configured to implement the enforcement of an approved memory map by denying access (whether write, read or both) to specific predefined address ranges in the memory (both storage and runtime). In such a manner, as FIG. 20 illustrates, the exemplary inventive SREE component is configured to ensure that the approved memory map isn't being invalidated and the protected memory regions aren't being accessed. Table 2 illustrates an exemplary code which can be utilized by the exemplary inventive SREE component to perform in accordance with the example of FIG. 20.

TABLE 2

```
BOOL EnforcementMemoryMap(MemOp operation, MemType type, Mem_Ad address)
{
    If(operation = = READ)
    {
.       If(IsAddressReadable(type, address) == TRUE // Check whether
.       the "address" is allowed read access in memory "type".
        // This Function contains the
        address access map for each memory
.           return TRUE;
.       else
.           return FALSE;
    }
    else // operation == write
    {
.       if(IsAddressWritable (type, address) == TRUE) // Check whether
.       the "address" is allowed write access in memory "type".
.           return TRUE; // Return TRUE in case of successful write
.           and FALSE in case of failed write
.       else
.           return FALSE;
    }
}
```

Figure 21:
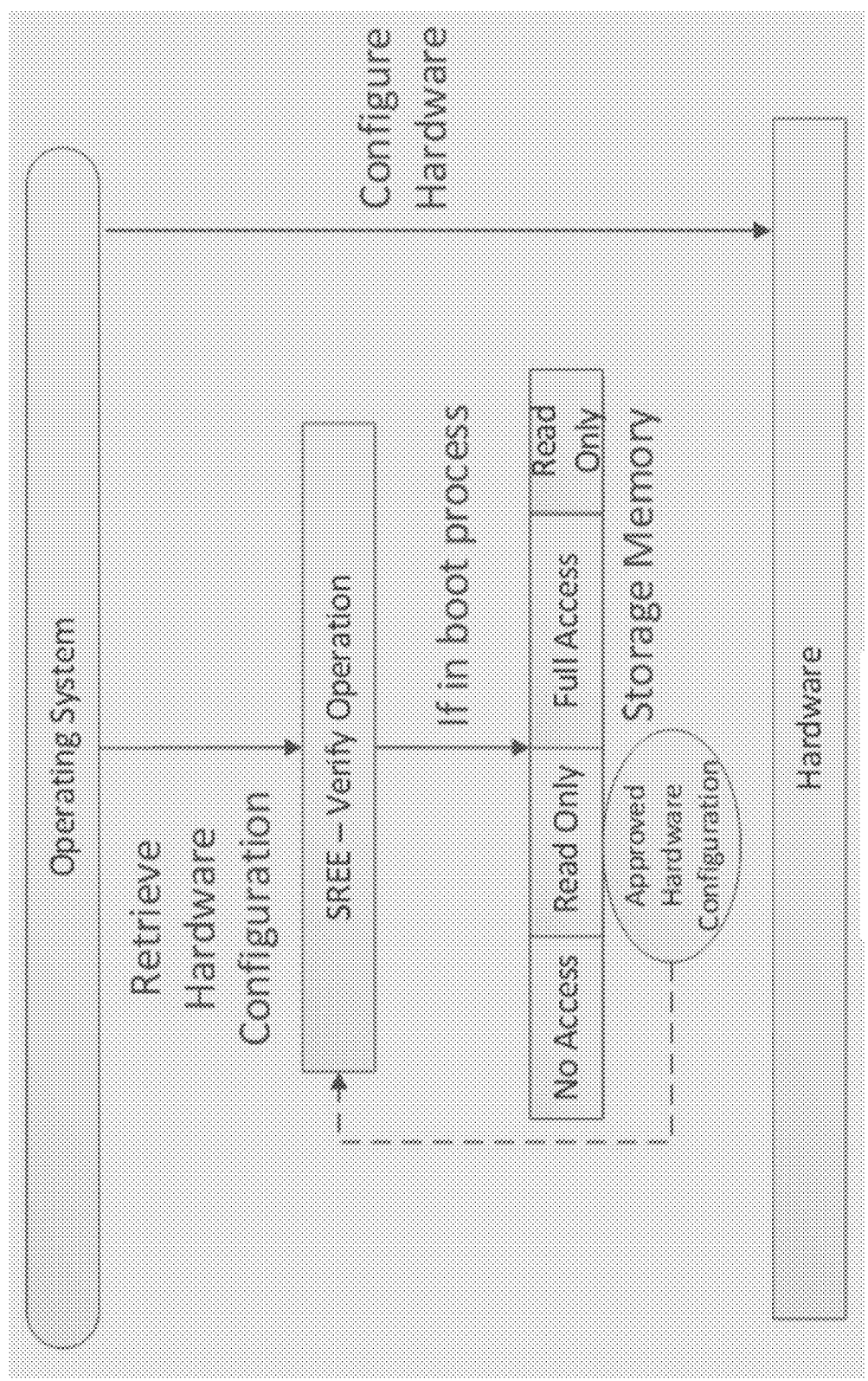

In some embodiments, the exemplary inventive SREE component is configured to implement the enforcement of an exemplary approved hardware configuration, by, for example, storing a list of memory addresses which contain the hardware configuration and allow only read operations. For example, as shown in FIG. 21, during a system boot (or an initialization procedure), the exemplary inventive SREE component is configured to enforce a read-only access to hardware during the boot process only and then prevent any access to these memory spaces, making this memory segment into Read Only Memory (ROM). In some embodiments, once the approved hardware configuration is retrieved successfully, the exemplary inventive SREE component is configured to allow the operating system or any other software/firmware to configure the hardware components. Table 3 illustrates an exemplary code which can be utilized by the exemplary inventive SREE component to perform in accordance with the example of FIG. 21.

TABLE 3

```
BOOL EnforceHWCOnfig(MemOp operation, MemType type, Mem_Ad address)
{
    if (operation != READ) // Only read operations are allowed for HW config addresses
.       return FALSE;
    if (type != STORAGE_MEM) //HW config is stored in Storage Memory only
.       return FALSE;
    If (IsSystemInBoot( ) != TRUW) // Enforce reading only when system is in boot -
optional
.       return FALSE;
    if (IsAdressHWConfig(address) == FALSE
.       Return TRUE;
    if (IsAddressReadable(type, address) == TRUE)
.       Return TRUE;
    else
.       return FALSE;
}
```

Figure 22:
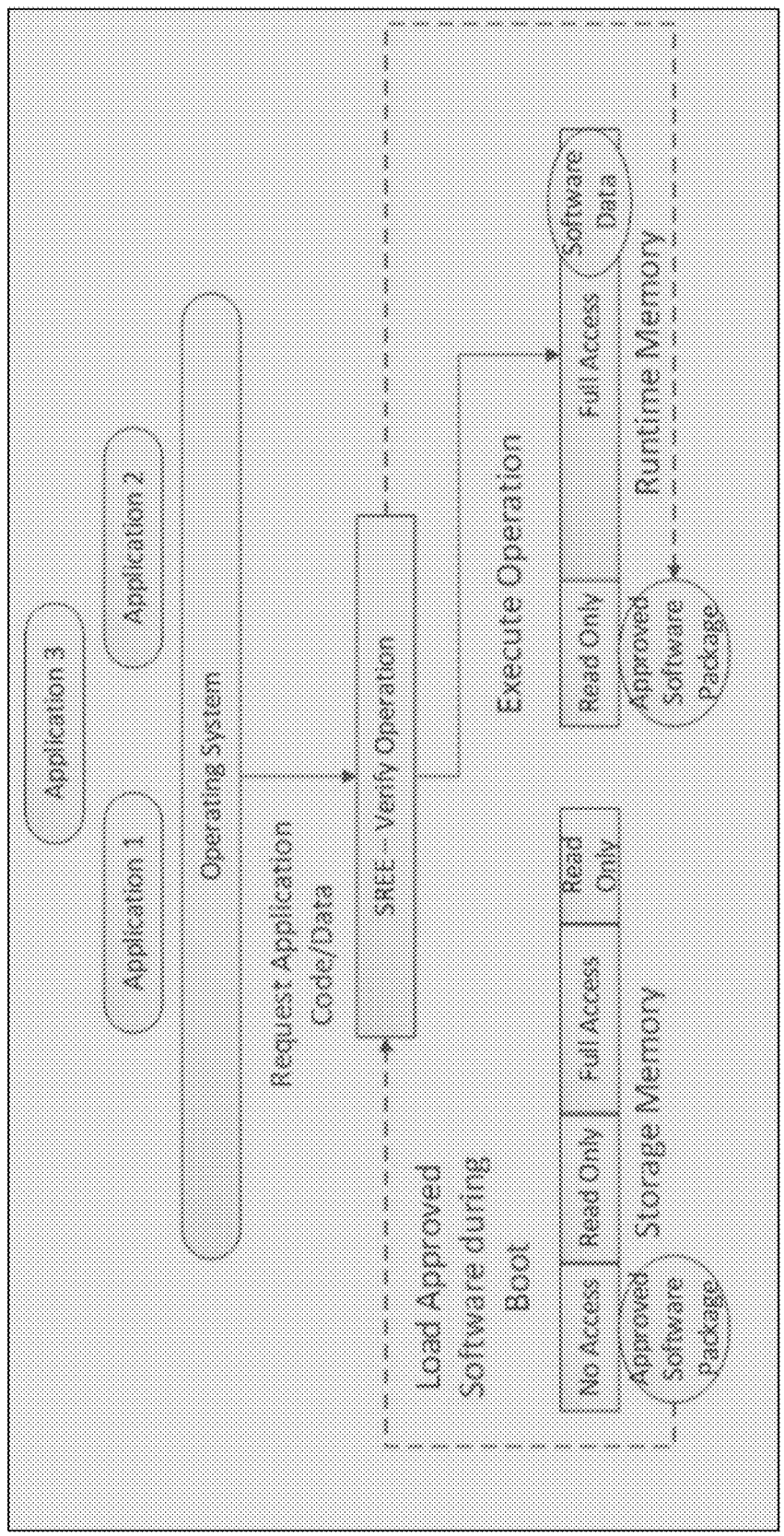

In some embodiments, the exemplary inventive SREE component is configured to implement the enforcement of an exemplary approved software package hardware configuration, by utilizing at least two mechanisms, one for storage memory and the other for runtime memory as shown in FIG. 22. In some embodiments, to prevent modification of the approved software package stored in the storage memory, the exemplary inventive SREE component is configured to utilize a list of address spaces where the approved software package is stored and prevent any modification to it (e.g., all write access will be prevented). In some embodiments, an operating system is programmed to load software only from these secure address spaces, moreover the exemplary inventive SREE component can be stored in these secure address spaces as well. For example, these secure address spaces are included in the approved memory map and enforced, by the exemplary inventive SREE component through it.

In some embodiments, the exemplary inventive SREE component is configured to prevent a modification in the runtime memory, by employing a two-part approach. The first part of the runtime memory shall have read permissions only and contain the executable code of the approved software packages during the runtime. For example, the exemplary inventive SREE component enforces the loading of such code according to the approved software package specification during the boot process and without the intervention of the operating system. The operating system is able to read it from the runtime memory in order to execute the software. The operating system must contain a static configuration of address spaces of all approved software code in order to execute it. All data which is used by software during the runtime shall be stored in a non-protected section of the runtime memory (the second part) and is made fully available to the operating system. Such separation shall be fully static and configured in advance as part of the approved memory map. For example, the memory sections reserved for the exemplary inventive SREE component shall be denied access according to the approved memory map. Table 4 illustrates an exemplary code which can be utilized by the exemplary inventive SREE component to perform in accordance with the example of FIG. 22.

TABLE 4

```
BOOL LoadSoftwarePackage( ) //Load software package from storage memory to runtime memory during boot
{
    if (IsSystemInBoot ( ) != TRUE)
        return FALSE;
    image = ReadSoftwarePackgeImageFromStorageMem(START_ADDRESS,
    END_ADDRESS): //Loads software image from storage
    if (image == FALSE)
        return FALSE;
    return WriteSiftwarePackgeImageToRuntimeMem(image); //Writes the
    image to runtime memory and return TRUE if succeeded
}
BOOL EnforceSoftwarePackage(MemOp operation, MemType type, Mem_Ad address)
{
    if (type == STORAGE)
        return TRUE;
    return EnforceMemoryMAp(oepration, RUNTIME, address); // The memory
    map contains all memeory segments which are denied
        // access and contain the software package
}
```

Figure 23:
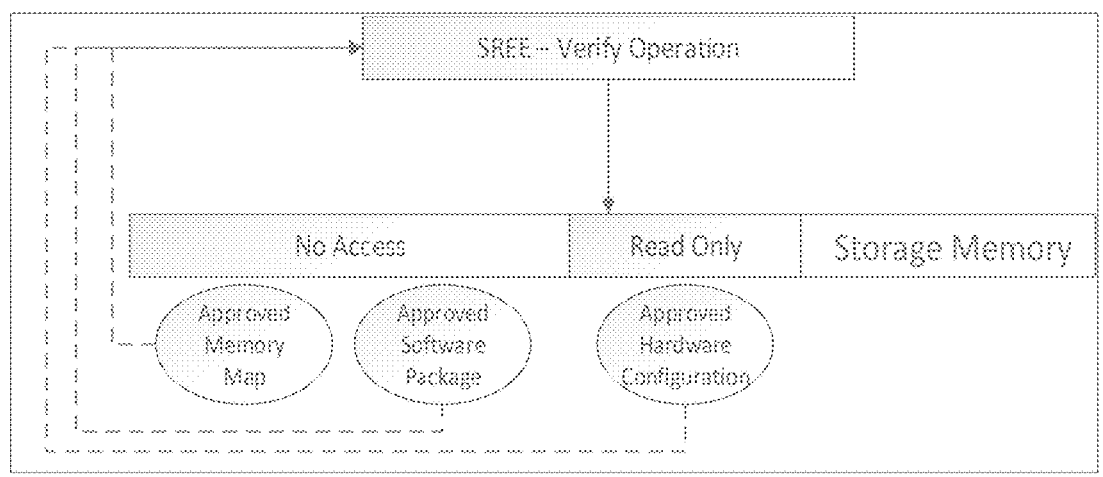

In order to store the approved memory map, approved hardware configuration and approved software list, the exemplary inventive SREE component is configured to use a dedicated part of the storage memory which will be mapped as inaccessible and used by the exemplary inventive SREE component only as shown in FIG. 23.

Figure 24:
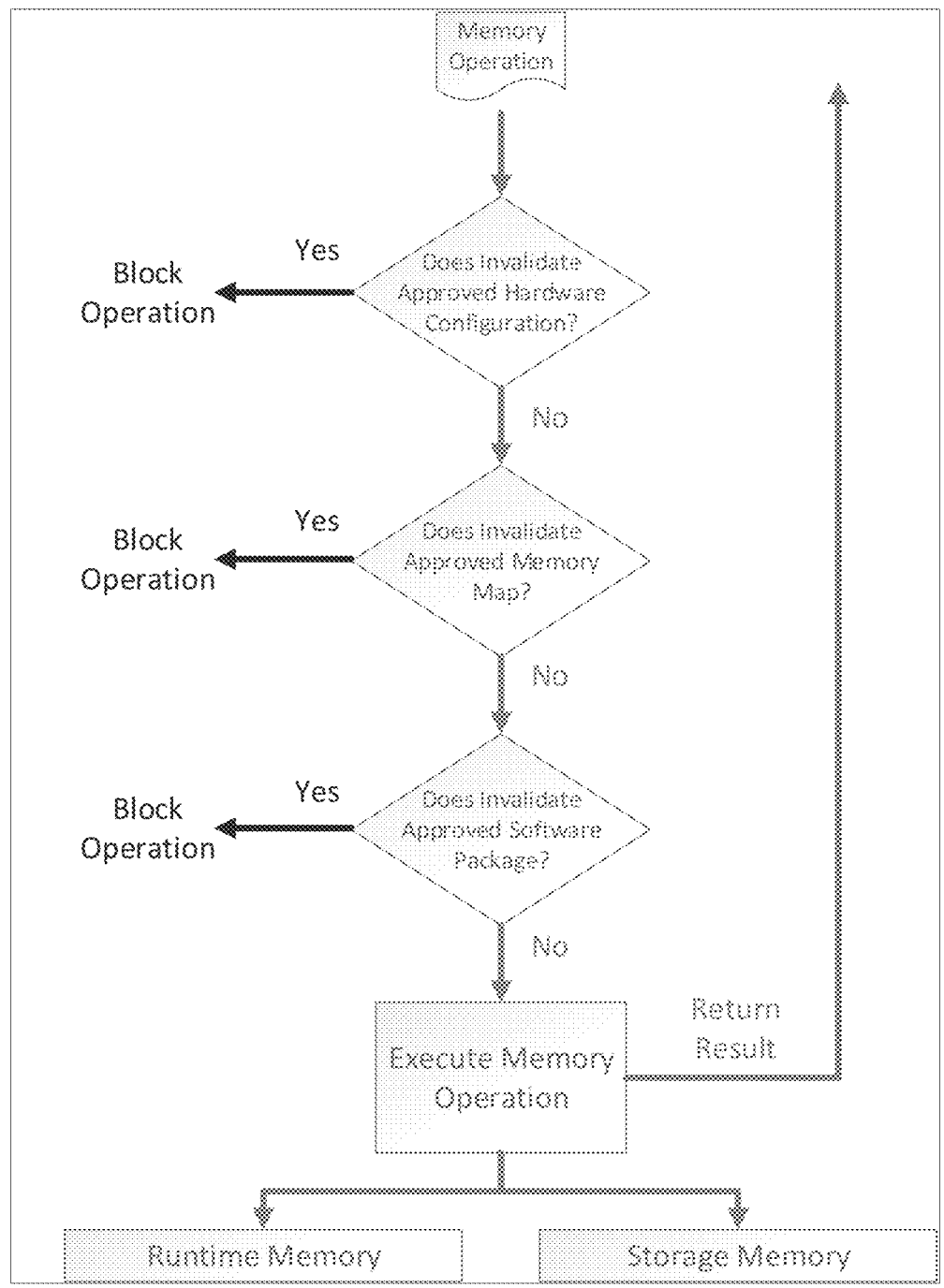

In some embodiments, the exemplary inventive SREE component is configured to use a dedicated hardware storage memory which the operating system is not aware of (the address spaces of the dedicated hardware storage memory are not known or reflected by the memory controller to the OS) and only the exemplary inventive SREE component is configured to access the dedicated hardware storage memory.

the validation in any order. In case, the exemplary inventive SREE component invalidates the memory access command, the exemplary inventive SREE component blocks (not permitting to be executed) the memory access command and an attack are prevented. If the exemplary inventive SREE component approves the memory access command, the operation shall be executed by the exemplary inventive SREE component or being passed for execution by the exemplary inventive SREE component to another component (e.g., micro-processor) and any result (e.g. the result of the memory read operation) returned by the exemplary inventive SREE component or by another component, as shown in FIG. 24. Table 5 illustrates an exemplary code which can be utilized by the exemplary inventive SREE component to perform in accordance with the example of FIG. 24.

TABLE 5

```
MemVal ExecuteMemoryOperation(MemOp operation, MemType type, Mem_Ad address, MemVal value)
{
    if (enforceHWConfig(operation, type, address) != TRUE)
        return FALSE;
    if (EnforceMemoryMap(operation, type, address) != TRUE)
        return FALSE;
    if (EnforceSoftwarePackage(operation, typr, address) != TRUE)
        return FALSE;
    if (operation == READ)
        return ReadMemory(type, address); // Reads memory and return value
    else // write operation
        return WriteMemory(type, address, value); Writes "value" into memory and return
        TRUE of succeeded
}
```

Figure 25:
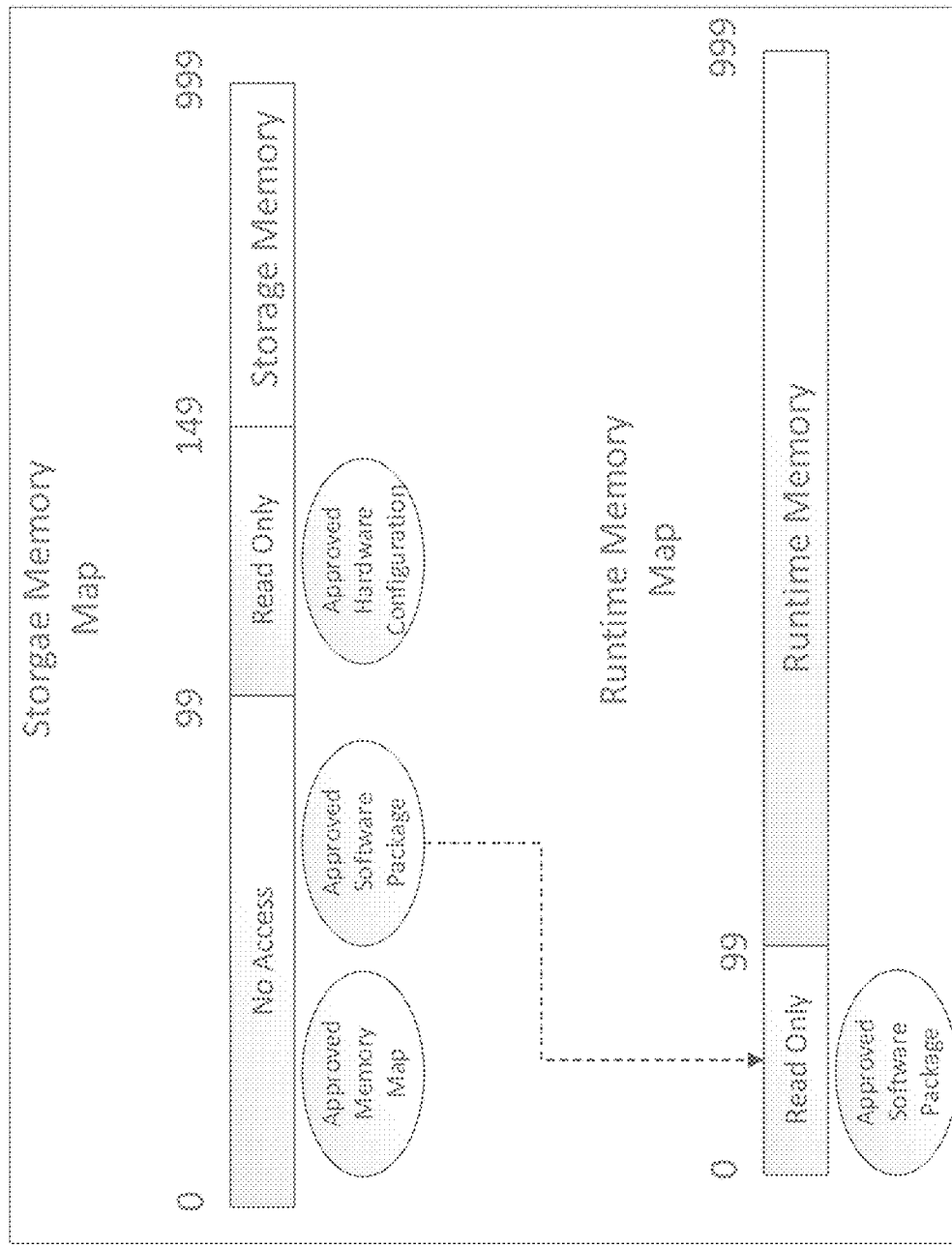

In some embodiments, for example, when a memory access command is issued, the exemplary inventive SREE component is configured to verify whether to execute the memory access command or not according to at least one of the type of operation, memory being accessed and/or specific memory address (and/or range of addresses) being accessed; and by checking at least one of whether the memory access command invalidates the approved software package, whether the memory access command invalidates the approved memory map and whether the memory access command invalidates the approved hardware configuration (or any subset of thereof). In some embodiments, the exemplary inventive SREE component is configured to perform For example, FIG. 25 illustrates an exemplary approved memory map for storage and runtime memory (addresses are in bytes). During the boot process the software package (or software image) is coped from the storage memory to the runtime memory so it can run. During boot the hardware configuration is accessed to configure the hardware and afterwards access will be prevented. After the boot process has finished (the boot process lasts between the time the ECU is turned on until the operating system is fully loaded and running), all memory access attempts shall go through the validation schema enforced by the exemplary inventive SREE component as, for example, shown in FIG. 24. For instance, a storage memory access to write into address 128 is denied, however reading from address 228 is executed.

Write attempt to runtime memory address 56 is denied while read attempt is allowed. Addresses 0-99 in the storage memory shall be used by the exemplary inventive SREE component only to read the configuration of the approved memory map and/or approved software packages. Table 6 illustrates an exemplary code which can be utilized by the exemplary inventive SREE component to perform in accordance with the example of FIG. 25.

TABLE 6

```
BOOL IsAddressReadable(MemType type, Mem_Ad address)
{
    if (type == STORAGE)
      if (address > 99)
        return TRUE;
    if (type = RUNTIME)
      return TRUE;
    Return FALSE;
}
BOOL IsAddressWritable(MemType type. Mem_Ad address)
{
    if (type == STORAGE)
      if (address > 149)
        return TRUE:
    if (type == RUNTIME)
      if (address > 99
        return TRUE;
    Return FALSE;
}
BOOL IsAddressHWConfig(MemType type, Mem_Ad address)
{
    if (type == RUNTIME)
      return FALSE;
    if (address < 150 && address > 99)
      return TRUE;
    return FALSE;
}
```

In some embodiments, the exemplary inventive SREE component is configured to enforce the configuration lockdown by utilizing any combination of the above enforcement components (e.g., the approved memory map, the approved software packages and the approved hardware configuration). In some embodiments, the exemplary inventive SREE component is configured to perform verification in any order between the above enforcement components. For example, the exemplary inventive SREE component is configured to join together the above enforcement components into a single verification condition (instead of breaking them up into three). For example, in some embodiments, the approved memory map and approved hardware configuration can also be loaded into the runtime memory during boot and reside within the protected memory space there.

For example, by preventing all access to the storage memory which contains all configuration and executable software code, the exemplary inventive SREE component is configured to provide protection in case malicious software manages to gain access to the ECU. Even if malicious software manages to run itself on parts of the runtime memory, which are unprotected, the malicious software is not be able to store itself in memory and load the next time the ECU is turned on. Thus, the exemplary inventive SREE component is configured to ensure that, for example, once the ECU is turned off and is back on, only the approved software loads and runs. The exemplary inventive SREE component is configured to ensure that, for example, once the ECU is turned down, it will revert to the predefined static configuration which doesn't include the malicious code.

In some embodiments, beyond enforcing the approved software package and/or the other above enforcement components, the exemplary inventive SREE component is configured to be transparent to the operating system (OS) and any application running on top of the OS. For example, if an application tries to access the protected memory as if the protected memory is not there, the application may receive an access error which the exemplary inventive SREE component can return but without necessarily alerting the application the actual cause for the error. For example, only in the case of the approved software package enforcement in the runtime memory (for example, if only the enforcement of the storage memory is used, then the exemplary inventive SREE component is also transparent), the OS must be aware of the exemplary inventive SREE component as described above.

In some embodiments, the exemplary inventive SREE component is configured as a static component with the static operation logic. For example, the exemplary inventive SREE component is configured to be independent from the Operating System (which only needs to know the mapping it enforces, thus being dependent on the exemplary inventive SREE component, but not the other way around) and from the way the Operating System runs an application. In some embodiments, the exemplary inventive SREE component is configured to only enforce the lockdown configuration by validating the memory access.

In some embodiments, the exemplary inventive SREE component is configured to also serve as firmware memory management unit (MMU) which reduces the need for a hardware management unit and allows the enforcement to be completely transparent to the OS. The OS relies on the memory management unit to provide the total address space of the memory which is accessible to the OS. Thus, if the exemplary inventive SREE component is also the MMU, the exemplary inventive SREE component only declares to the OS the address ranges which are not locked down. In addition, the exemplary inventive SREE component is configured to virtualize memory allocation of the OS so that once the OS decides to load the approved software into the runtime memory, the exemplary inventive SREE component is configured to verify that it is indeed in the approved software, by loading the software, separating its code and data memory while relaying to the OS that they are not separated. Thus, the exemplary inventive SREE component is configured to virtually translate the address where the OS would like the code to be into the actual protected address where the code resides.

Figure 26:
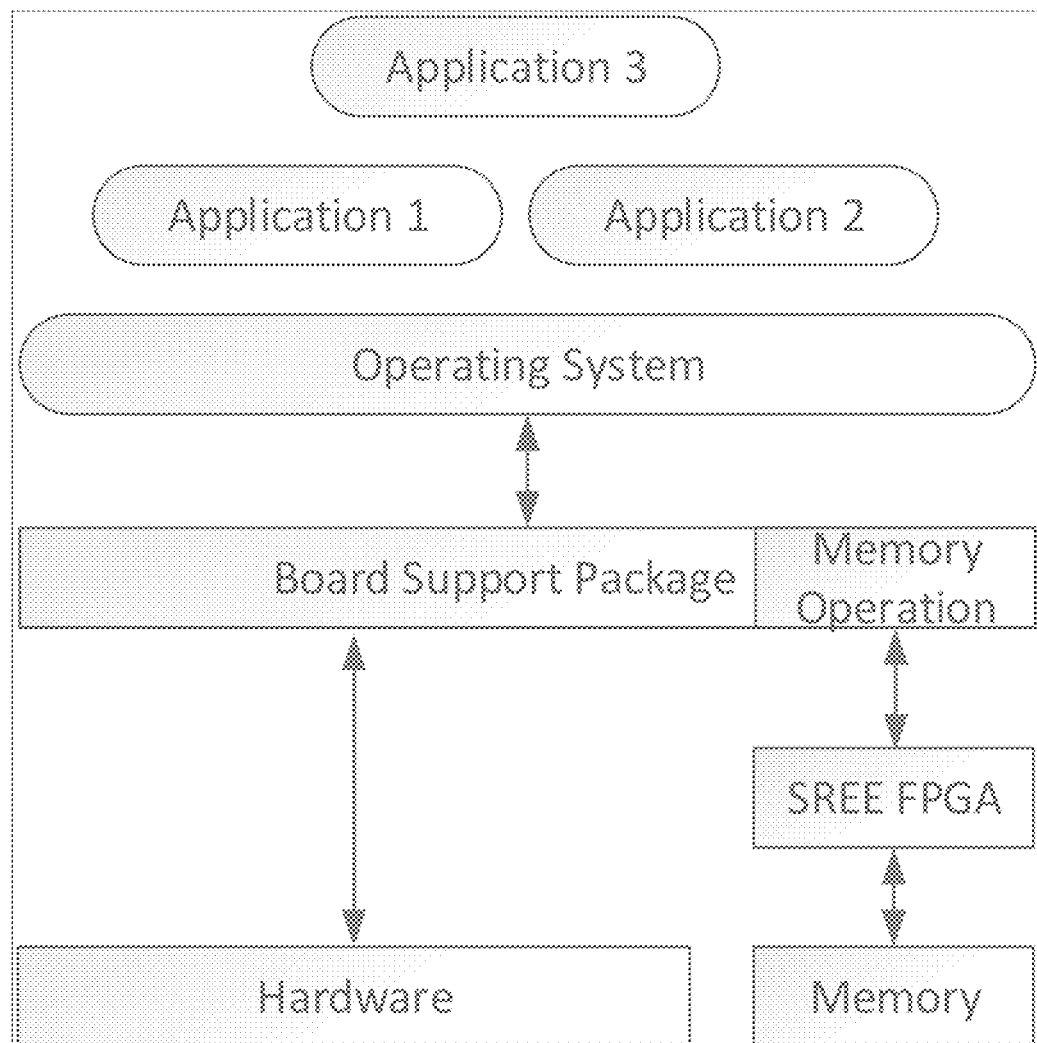

In some embodiments, the exemplary inventive SREE component is configured to include at least one microprocessor and/or FPGA which is connected between the memory and the rest of the ECU components as described in FIG. 26. For example, in some embodiments, the inventive FPGA is implemented having the same logic as described above (FIG. 21-24) and maintain the approved software configuration, approved memory map and approved hardware configuration. In some embodiments, the enforcement configurations is stored in the storage memory and protected by the inventive FPGA. In some embodiments, the inventive FPGA is configured to decide whether to allow or deny memory operations during runtime while maintaining required memory segmentation (e.g., no access, read-only, etc.) and executing preliminary tasks of loading code from storage memory into runtime memory as described in FIG. 22.

In some embodiments, the exemplary inventive SREE component is configured to provide the memory access enforcement utilizing a hypervisor to provide a firmware layer which may supervise access in between the OS and the hardware and decide whether to allow or deny memory operations during the runtime while (1) maintaining the required memory segmentation (e.g., no access, read-only, etc.) and (2) executing preliminary tasks of loading code from storage memory to runtime memory. In some embodiments, the exemplary inventive SREE component providing a hypervisor may be configured to virtualize a memory allocation of the OS so that once the OS decides to load the approved software into the runtime memory, the exemplary inventive SREE component is configured to verify that it is indeed in the approved software, by loading the software and separating its code and data memory while relaying to the OS that they are not separated. Thus, the exemplary inventive SREE component may be configured to virtually translate the address where the OS would like the code to be into an actual protected address where the code would reside.

Illustrative Examples for Secure Physical Separation of Communication Networks in ECU(s)

In some embodiments, to enforce the security communication lockdown, the inventive lockdown device(s) is/are configured to enforce the separation between different interconnected networks which are connected to the inventive lockdown device(s). For example, as detailed above, the inventive lockdown device(s) can be configured to enforce the software level separation through the inventive separation kernel(s) enforcing that each communication interface resides in its own partition.

In some embodiments, to enforce the security communication lockdown in case of, for example, Denial of Service (DoS) attacks, the inventive lockdown device(s) can be further configured to enforce the hardware separation before an attacker is able to enter the system/device.

In some embodiments, to enforce the hardware separation, the exemplary inventive device(s) (e.g., the inventively modified ECUs) is/are configured to utilize, for example but not limited to, a specifically programmed Field Programmable Gate Array (FPGA) chip, a complex programmable logic device (CPLD) and/or another similarly suitable programmable hardware processor. Specifically, the inventive modified FPGA contains a matrix of basic logic cells which can be interconnected in any way to enforce a static configuration which cannot be changed during runtime. For example, in some embodiments, the inventive modified FPGA can be configured to have separate hardware transceivers for each interface. For example, a transceiver for a specific interface implements the electrical and electronic communication protocol required to send and receive data over a specific interface (e.g. Ethernet, CAN, MOST, etc.). Having a separate set of transceivers for each specific interface allows the inventive modified FPGA to communicate with all of the different hardware interfaces which connect to the inventive communication lockdown device(s). For example, in some embodiments, the transceivers can be either external dedicated hardware or internal to the FPGA in form of on chip hardware and/or semiconductor intellectual property (IP) core(s) (each which is a reusable unit of logic, cell, or chip layout design implementation of a particular functionality on FPGA; to program an FPGA, one can use IP core(s) which define hardware components inside it).

For example, the present invention can utilize a dedicated transceiver which is suitably similar to Texas Instruments Inc.'s TCAN334G™ chip. For example, the present invention can configure hardware which is suitably similar to an illustrative System on Chip with built-in FPGA and CAN transceivers of Xilinx, Inc.'s Zynq 7000™. For example, the present invention can utilize Xilinx, Inc.'s CAN IP core which can be implemented in the FPGA to allow for communications.

Figure 29:
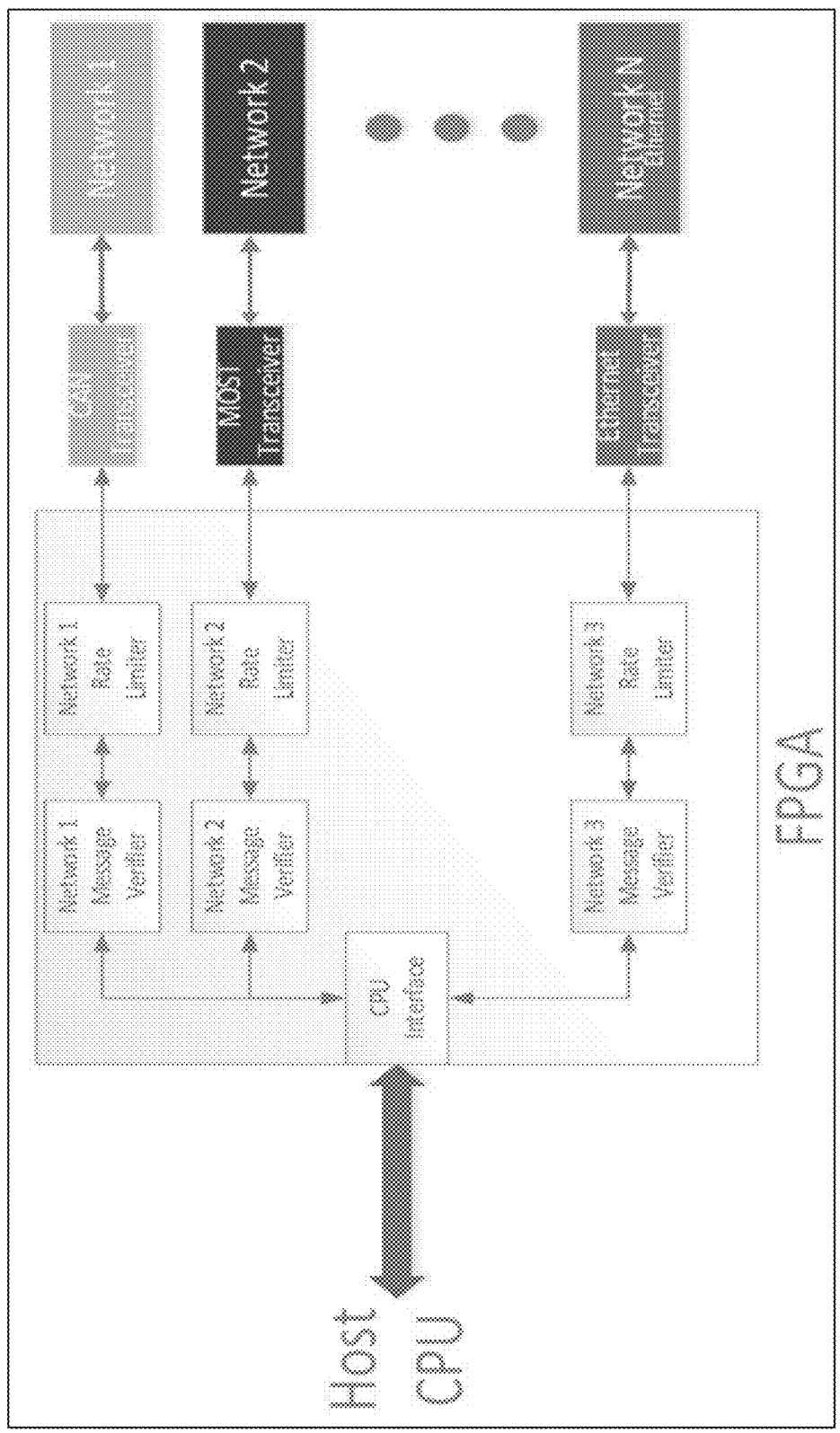

As used herein, the term "transceiver" is directed to a combination of hardware and software that typically translates analog signals going on buses into digital bits. For example, some transceivers can also assemble the bits into a packet. For example, each IP core in accordance with the present invention receives individual bits from respective transceiver(s) and assembles them into packet(s) and/or message(s) according to a particular communication protocol. In some embodiments, with the built-in transceivers, usually both functions (i.e., the translation and the assembly) can be included. In some embodiments, with the external transceivers, the inventive modified FPGA can be configured to include each respective IP core. For example, FIG. 29 illustrates exemplary external transceivers.

Figure 27:
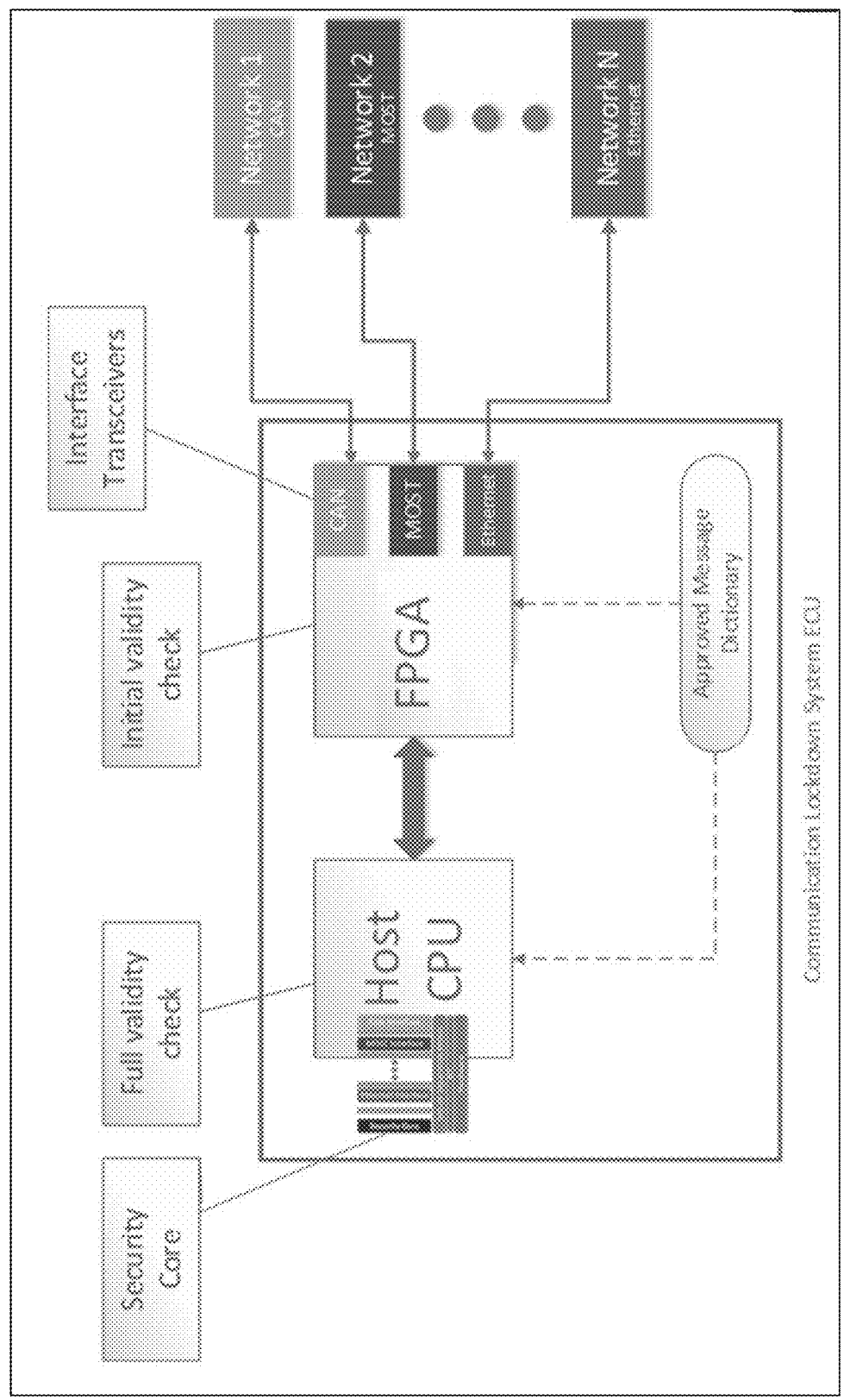

In turn, in some embodiments, the inventive modified FPGA can communicate with the processor running the above detailed inventive communication lockdown system firmware and software as shown in FIG. 27. FIG. 10 shows an enlarged view of a component which includes an item designated as "security core" in FIG. 27. In some embodiments, the security core can include the inventive state machine and/or the approved message dictionary database, and/or the approved communication schema database.

For example, to enforce the security communication lockdown, the inventive lockdown device(s) can include the inventive modified hardware component (e.g., inventive modified FPGA) or components, at least one per each interface, which verify the communication integrity and rate according to the approved message dictionary and/or the approved communication schema; and communicate with all of the required networks (interfaces) accordingly. In some embodiments, the inventive modified hardware component within the inventive modified FPGA is statically constructed to verify communications against the approved message dictionary and/or the approved communication schema on, for example, the bit level. In some embodiments, to enforce the security communication lockdown, the inventive modified hardware component can be configured to perform a full verification of all communication and message bits, or a partial by only verifying a source and/or a destination of a message against the approved message dictionary database and/or the approved communication schema database. In some embodiments, the approved message dictionary database and/or the approved communication schema database can be statically stored in hardware as part of the inventive modified FPGA In some embodiments, to enforce the security communication lockdown, the approved message dictionary is programmed as part of the inventive modified FPGA configuration (e.g., a part of a network message verifier component) making, the inventive modified FPGA completely static in runtime. In some embodiments, to enforce the security communication lockdown, the inventive modified FPGA is configured to verify, for example, the approved rate of messages on a specific interface, a specific type of messages, etc. Any message which will not pass the verification is dropped (blocked) and thus the inventive modified FPGA is configured to block the attack.

Figure 28:
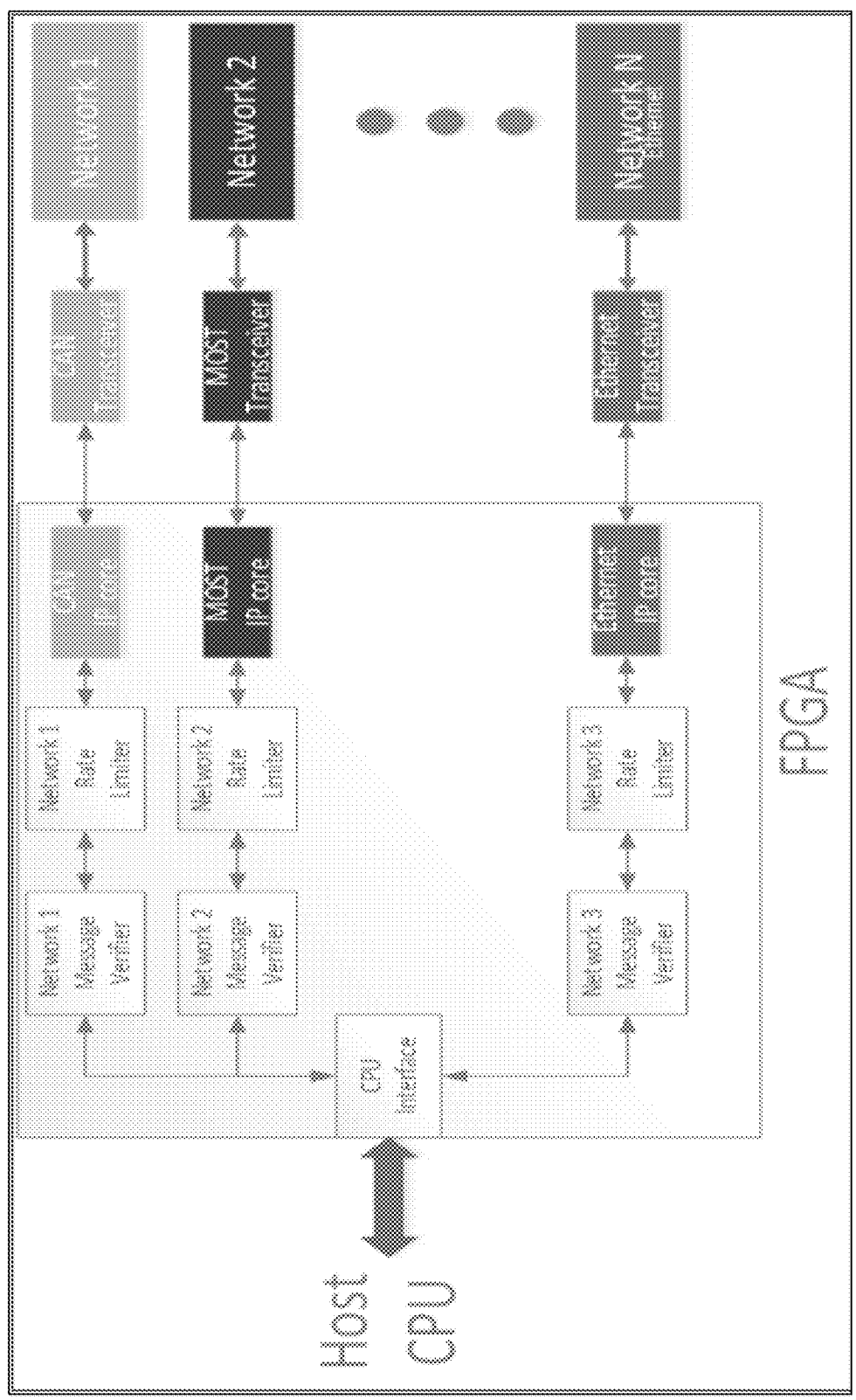

In some embodiments, all network interfaces communicate with the host CPU via a unified communication interface (e.g., Ethernet) which can also translate the communication into a unified protocol and back (e.g., TCP/IP). FIG. 28 shows an example of the inventive hardware network separation based on the inventive modified FPGA. For example, the inventive hardware network separation based on the inventive modified FPGA can allow for at least one of the following:

increasing in a speed of execution since the inventive modified FPGA serves as the dedicated hardware component used only for specific purpose, being physically separate from all other interfaces and the system software, offloading some of the processing from the software component on the CPU which needs to do more complex analysis (e.g., in case of a DoS attack, the attacking message(s) is/are stopped in the inventive hardware before they reach the software component, thus preventing the communication overflow from advancing), implementing basic checks against the approved message dictionary on a faster rate and may reduce a load on the inventive secure separation kernel, and being resilient to various forms of attacks such as, but not limited to, buffer overflows and code injection.

Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A device, comprising:
   wherein the device is located within a vehicle;
   wherein the device is an intermediary for a plurality of communication networks of the vehicle so that the device receives all electronic messages transmitted between the plurality of communication networks;
   wherein the plurality of communication networks of the vehicle comprises a plurality of electronic control units (ECUs);
   wherein the device comprises at least one secure communication lockdown component;
   wherein the at least one secure communication lockdown component is configured such that the device securely separates each respective source of each respective electronic message from each respective destination to which each respective electronic message has been directed;
   wherein each respective ECU of the plurality of ECUs is either each respective source or each respective destination;
   wherein the at least one secure communication lockdown component comprises:
   at least one processor programmed to execute at least one secure communication lockdown procedure and
   at least one non-volatile memory component, at least storing:
   i) at least one pre-defined communication schema, and
   ii) at least one software instruction for the at least one secure communication lockdown procedure;
   wherein the at least one pre-defined communication schema comprises:
   i) at least one pre-defined approved message dictionary, and
   ii) at least one finite state machine;
   wherein the at least one finite state machine comprises:
   i) a plurality of states for at least one component of the vehicle, and
   ii) a plurality of state transitions for each state of the plurality of states;
   wherein each state is associated with at least one state vector;
   wherein the at least one state vector comprises data representative of at least one of the following:
   i) at least one general parameter associated with at least one of:
   1) an overall operation of the vehicle and
   2) an overall condition of the vehicle,
   ii) at least one component-specific parameter associated with at least one operational state of the at least one component of the vehicle,
   iii) at least one ECU-specific parameter associated with at least one operational state of at least one ECU of the vehicle, and
   iv) at least one communication-specific parameter associated with at least one communication process that is associated with the vehicle;
   wherein the at least one state transition comprises data that is representative of a change in at least on state vector corresponding to the at least one state of the plurality of states;
   wherein the at least one processor of the at least one secure communication lockdown component is configured, at runtime, to execute the at least one software instruction of the at least one secure communication lockdown procedure that is configured to:
   receive each respective electronic message;
   verify at least one portion of each respective electronic message against:
   i) the at least one pre-defined approved message dictionary and
   ii) the at least one finite state machine;
   determine, based on the verification of the at least one portion of each respective electronic message, that each respective electronic message is:
   i) an unauthorized electronic message in accordance with the at least one pre-defined communication schema or
   ii) an approved electronic message in accordance with the at least one pre-defined communication schema; and
   perform one of:
   i) executing at least one administrative action with the unauthorized electronic message or
   ii) one of:
   1) transmitting the approved electronic message to each respective destination or
   2) modifying the approved electronic message with at least one pre-defined change to generate a changed approved electronic message and transmitting the changed approved electronic message to each respective destination.

2. The device of claim 1, wherein a source of at least one electronic message of all electronic messages received by the device or at least one destination of the at least one electronic message is located outside of the vehicle.

3. The device of claim 1, wherein the device physically separates at least one source of at least one electronic message of all electronic messages received by the device from at least one destination to which the at least one message has been directed.

4. The device of claim 1, wherein the at least one pre-defined approved message dictionary that comprises at least one of:
   1) all pre-defined electronic messages that can be generated within the vehicle during all possible state transitions within the plurality of states,
   2) a maximal rate at which each electronic message is allowed to be sent,
   3) a minimal rate at which each electronic message is allowed to be sent,
   4) all pre-defined source-destination messaging pairs associated with the plurality of states.

5. The device of claim 1, wherein the determination that each respective electronic message is the unauthorized electronic message comprises:
   querying the at least one pre-defined approved message dictionary based at least in part in on data from the at least one portion of each respective electronic message; and
   determining that the data is:
      i) not found in the at least one pre-defined approved message dictionary, or
      ii) invalid.

6. The device of claim 4, wherein, for each of the all pre-defined electronic messages, the at least one pre-defined approved message dictionary further comprises:
   at least one pre-defined message structure definition and
   at least one pre-defined value of each message parameter.

7. The device of claim 1, wherein the at least one finite state machine further comprises the at least one pre-defined approved message dictionary.

8. The device of claim 1, wherein the at least one administrative action is at least one of:
   1) dropping the unauthorized electronic message,
   2) erasing the unauthorized electronic message, and
   3) logging the unauthorized electronic message.

9. The device of claim 8, wherein the at least one secure lockdown component is configured to execute the at least one administrative action at one of:
   hardware,
   at least one location along a software stack, or
   both.

10. The device of claim 1, wherein the unauthorized electronic message is a message that:
    1) has no a corresponding state transition of the at least one finite state machine,
    2) is configured to cause at least one unapproved change in at least one corresponding state vector of the at least one finite state machine, or
    3) both.

11. The device of claim 1, wherein the at least one pre-defined communication schema further comprises at least one of:
    i) all pre-defined communication sequences for all electronic messages that are pre-defined based at least in part on the at least one finite state machine, and
    ii) all pre-defined communication protocols for all electronic messages that are pre-defined based at least in part on the at least one finite state machine.

12. The device of claim 4, wherein the at least one secure communication lockdown component is configured so that the at least one pre-defined communication schema is programmed in the form, comprising:
    1) a data logical layer that represents all pre-defined electronic messages of the at least one pre-defined approved message dictionary,
    2) a routing logical layer that represents all pre-defined source-destination messaging pairs of the at least one pre-defined approved message dictionary, and
    3) a context logical layer that represents all pre-defined communication sequences.

13. The device of claim 1, wherein the at least one pre-defined communication schema is pre-defined at least in part based, at least in part, on at least one of a vehicle specification of a vehicle manufacturer and an ECU specification of an ECU manufacturer of each respective ECU.

14. The device of claim 13, wherein the at least one secure communication lockdown component is further configured to perform at least one of:
    electronically obtain the at least one portion of the at least one pre-defined communication schema from at least one trusted electronic source, and
    dynamically generate, based at least in part on the vehicle specification, the at least one portion of the at least one pre-defined communication schema.

15. The device of claim 1, wherein the unauthorized electronic message is based, at least in part, on at least one cyber threat.

16. The device of claim 1, wherein the at least one secure communication lockdown procedure is further configured to generate at least one indication of the unauthorized electronic message, wherein the at least one indication is configured to identify at least one of:
    1) each respective electronic message as being the unauthorized electronic message, and
    2 at least one reason why each respective electronic message has been determined to be the unauthorized electronic message.

17. The device of claim 16, wherein the at least one secure communication lockdown procedure is further configured to perform at least one of:
    log the at least one indication of the unauthorized electronic message, and
    transmit the at least one indication of the unauthorized electronic message to at least one external electronic destination that is located outside of the device.

18. The device of claim 1, wherein the modifying the approved electronic message with at least one pre-defined change to generate a changed approved electronic message comprises:
    adding metadata to the approved electronic message, wherein the metadata is configured so that the approved electronic message is recognized as being approved by the device.

19. The device of claim 1, wherein the at least one secure communication lockdown procedure is further configured to generate at least one indication of the at least one administrative action performed with the unauthorized electronic message.

20. The device of claim 19, wherein the at least one secure communication lockdown procedure is further configured to perform at least one of:

log the at least one indication of the at least one administrative action performed with the unauthorized electronic message, and transmit the at least one indication of the at least one administrative action to at least one external electronic destination that is located outside of the device.

21. The device of claim 1, wherein the at least one secure communication lockdown procedure is further configured to perform at least one of:

generate at least one indication of the approved electronic message;

log the approved electronic message, the at least one indication, or both; and transmit the at least one indication of the approved electronic message to at least one external electronic destination that is outside of the device.

22. A method, comprising:

incorporating, into a vehicle, a device so that the device is located within a vehicle;

wherein the device is an intermediary for a plurality of communication networks of the vehicle so that the device receives all electronic messages transmitted between the plurality of communication networks;

wherein the plurality of communication networks of the vehicle comprises a plurality of electronic control units (ECUs);

wherein the device comprises at least one secure communication lockdown component;

wherein the device comprises at least one secure communication lockdown component;

wherein the at least one secure communication lockdown component is configured such that the device securely separates each respective source of each respective electronic message from each respective destination to which each respective electronic message has been directed;

wherein each respective ECU of the plurality of ECUs is either each respective source or each respective destination;

wherein the at least one secure communication lockdown component comprises:

at least one processor programmed to execute at least one secure communication lockdown procedure and at least one non-volatile memory component, at least storing:
  i) at least one pre-defined communication schema, and
  ii) at least one software instruction for the at least one secure communication lockdown procedure;

wherein the at least one pre-defined communication schema comprises:
  1) at least one finite state machine,
  2) at least one pre-defined approved message dictionary, and
  3) at least one of:
    i) all pre-defined communication sequences for all electronic messages that are pre-defined based at least in part on the at least one finite state machine, and
    ii) all pre-defined communication protocols for all electronic messages that are pre-defined based at least in part on the at least one finite state machine;

wherein the at least one finite state machine comprises:
  i) a plurality of states for at least one component of the vehicle, and
  ii) a plurality of state transitions for each state of the plurality of states;

wherein each state is associated with at least one state vector;

wherein the at least one state vector comprises data representative of at least one of the following:
  i) at least one general parameter associated with at least one of:
    1) an overall operation of the vehicle and
    2) an overall condition of the vehicle,
  ii) at least one component-specific parameter associated with at least one operational state of the at least one component of the vehicle,
  iii) at least one ECU-specific parameter associated with at least one operational state of at least one ECU of the vehicle, and
  iv) at least one communication-specific parameter associated with at least one communication process that is associated with the vehicle;

wherein the at least one state transition comprises data that is representative of a change in at least on state vector corresponding to the at least one state of the plurality of states;

wherein the at least one pre-defined approved message dictionary that comprises at least one of:
  1) all pre-defined electronic messages that can be generated within the vehicle during all possible state transitions within the plurality of states,
  2) a maximal rate at which each electronic message is allowed to be sent,
  3) a minimal rate at which each electronic message is allowed to be sent,
  4) all pre-defined source-destination messaging pairs associated with the plurality of states;

receiving, by the device, each respective electronic message; and executing, by the device, the at least one secure communication lockdown procedure, by at least:

verifying at least one portion of each respective electronic message against:
  i) the at least one pre-defined approved message dictionary and
  ii) the at least one finite state machine;

determining, based on the verification of the at least one portion of each respective electronic message, that each respective electronic message is:
  i) an unauthorized electronic message in accordance with the at least one pre-defined communication schema or
  ii) an approved electronic message in accordance with the at least one pre-defined communication schema; and performing one of:
  i) executing at least one administrative action with the unauthorized electronic message or
  ii) one of:
    1) transmitting the approved electronic message to each respective destination or 2) modifying the approved electronic message with at least one pre-defined change to generate a changed approved electronic message and transmitting the changed approved electronic message to each respective destination.

23. The method of claim 22, wherein a source of at least one electronic message of all electronic messages received by the device or at least one destination of the at least one electronic message of all electronic messages received by the device is located outside of the vehicle.

24. The method of claim 22, wherein the at least one finite state machine further comprises the at least one pre-defined approved message dictionary.

25. The method of claim 22, wherein the at least one administrative action is at least one of:
   1) dropping the unauthorized electronic message,
   2) erasing the unauthorized electronic message, and
   3) logging the unauthorized electronic message.

26. The method of claim 22,
   wherein the unauthorized electronic message is a message that:
      1) has no a corresponding state transition of the at least one finite state machine,
      2) is configured to cause at least one unapproved change in at least one corresponding state vector of the at least one finite state machine, or
      3) both; and
   wherein the determination that each respective electronic message is the unauthorized electronic message comprises:
   querying the at least one pre-defined approved message dictionary based at least in part in on data from the at least one portion of each respective electronic message; and
   determining that the data is no found in the at least one pre-defined approved message dictionary or is invalid.

27. The method of claim 22, wherein, for each of the all pre-defined electronic messages, the at least one pre-defined approved message dictionary further comprises:
   at least one pre-defined message structure definition and
   at least one pre-defined value of each message parameter.

28. The method of claim 22, wherein the at least one secure communication lockdown component is configured so that the at least one pre-defined communication schema is programmed in the form, comprising:
   1) a data logical layer that represents all pre-defined electronic messages of the at least one pre-defined approved message dictionary,
   2) a routing logical layer that represents all pre-defined source-destination messaging pairs of the at least one pre-defined approved message dictionary, and
   3) a context logical layer that represents all pre-defined communication sequences.

29. The method of claim 22,
   wherein the at least one pre-defined communication schema is pre-defined at least in part based, at least in part, on at least one of:
      a vehicle specification of a vehicle manufacturer and
      an ECU specification of an ECU manufacturer of each respective ECU; and performing at least one of:
         electronically obtaining the at least one portion of the at least one pre-defined communication schema from at least one trusted electronic source, and
         dynamically generating, based at least in part on the vehicle specification, the at least one portion of the at least one pre-defined communication schema.

30. The method of claim 22, wherein the unauthorized electronic message is based, at least in part, on at least one cyber threat.

* * * * *

UNITED STATES PATENT AND TRADEMARK OFFICE
CERTIFICATE OF CORRECTION

PATENT NO. : 9,866,563 B2
APPLICATION NO. : 15/486055
DATED : January 9, 2018
INVENTOR(S) : Teshler et al.

It is certified that error appears in the above-identified patent and that said Letters Patent is hereby corrected as shown below:

On the Title Page

Item [73] delete "Gaurdknox", and insert --Guardknox--.

Signed and Sealed this
Twentieth Day of February, 2018

Andrei Iancu
*Director of the United States Patent and Trademark Office*